United States Patent
Vrzic

(10) Patent No.: US 10,645,528 B2
(45) Date of Patent: May 5, 2020

(54) SYSTEM AND METHODS FOR RELIABLE COMMUNICATION WITH MOBILITY ALONG A PREDICTABLE ROUTE

(71) Applicant: Sophie Vrzic, Kanata (CA)

(72) Inventor: Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/239,224

(22) Filed: Aug. 17, 2016

(65) Prior Publication Data

US 2017/0086049 A1 Mar. 23, 2017

Related U.S. Application Data

(60) Provisional application No. 62/220,682, filed on Sep. 18, 2015, provisional application No. 62/255,101, filed on Nov. 13, 2015.

(51) Int. Cl.
*H04W 4/02* (2018.01)
*H04L 12/725* (2013.01)
(Continued)

(52) U.S. Cl.
CPC ........... *H04W 4/023* (2013.01); *H04L 45/306* (2013.01); *H04W 4/029* (2018.02); *H04W 4/90* (2018.02);
(Continued)

(58) Field of Classification Search
CPC .... H04L 45/306; H04L 67/327; H04W 12/00; H04W 36/0016; H04W 36/08;
(Continued)

(56) References Cited

U.S. PATENT DOCUMENTS 9,930,587 B2 3/2018 Vrzic et al.
2002/0131400 A1 9/2002 Tinsley et al.
(Continued)

FOREIGN PATENT DOCUMENTS

CN 1703103 A 11/2005
CN 101247543 A 8/2008
(Continued)

OTHER PUBLICATIONS

International Search Report dated Dec. 1, 2016 for corresponding International Application No. PCT/CN2016/099230 filed Sep. 18, 2016.
(Continued)

*Primary Examiner* — Erica Navar

(57) ABSTRACT

Embodiments provide high reliability and responsiveness by dedicating resources both at the RAN and the core to provide high throughput, low latency communication for a critical communication service. Radio resources can be allocated to the machines in the ambulance as and where needed to guarantee the required QoS. Further, as the route an ambulance will follow to the hospital is known or can be predicted, this information is exploited by embodiments to further reduce communication delay by instantiating VNFs closer to the edge where and when they are needed. Further, end-to-end paths can be configured in advance between each access point and a hospital. In some embodiments, core network functions can be isolated from other traffic in the network so that the performance of the critical communication service is not impacted by other services. Low latency can be further enhanced by customized processing of the traffic.

32 Claims, 19 Drawing Sheets

(51) Int. Cl.
  *H04W 12/00* (2009.01)
  *H04W 4/029* (2018.01)
  *H04W 4/90* (2018.01)
  *H04W 40/00* (2009.01)
  *H04W 4/40* (2018.01)
  *H04W 36/32* (2009.01)
  *H04W 36/00* (2009.01)
  *H04W 36/08* (2009.01)
  *H04W 48/20* (2009.01)
  *H04W 88/16* (2009.01)

(52) U.S. Cl.
  CPC .......... *H04W 12/00* (2013.01); *H04W 40/00* (2013.01); *H04W 4/40* (2018.02); *H04W 36/0016* (2013.01); *H04W 36/08* (2013.01); *H04W 36/32* (2013.01); *H04W 48/20* (2013.01); *H04W 88/16* (2013.01)

(58) Field of Classification Search
  CPC ... H04W 36/18; H04W 40/00; H04W 40/205; H04W 48/20; H04W 4/029; H04W 4/046; H04W 4/22; H04W 4/90; H04W 88/16; H04W 36/32
  USPC ................................. 455/404.2, 456.1–457
  See application file for complete search history.

(56) References Cited

U.S. PATENT DOCUMENTS

| | | | |
|---|---|---|---|
| 2009/0046583 A1 | 2/2009 | Towster et al. | |
| 2010/0136994 A1* | 6/2010 | Kim | H04L 5/0035 455/450 |
| 2011/0310865 A1* | 12/2011 | Kennedy | H04W 4/029 370/338 |
| 2011/0310899 A1 | 12/2011 | Alkhatib | |
| 2012/0178414 A1 | 7/2012 | Fiatal | |
| 2014/0201374 A1 | 7/2014 | Ashwood-Smith et al. | |
| 2014/0281030 A1 | 9/2014 | Cui et al. | |
| 2014/0321328 A1 | 10/2014 | Zuniga et al. | |
| 2015/0055461 A1 | 2/2015 | Hahn | |
| 2015/0058938 A1 | 2/2015 | Gaspar | |
| 2015/0124622 A1* | 5/2015 | Kovvali | H04W 28/0215 370/236 |
| 2015/0180730 A1 | 6/2015 | Felstaine | |
| 2015/0222561 A1 | 8/2015 | Okuno et al. | |
| 2015/0288541 A1 | 10/2015 | Fargano | |
| 2015/0334045 A1 | 11/2015 | Tremblay et al. | |
| 2016/0006696 A1 | 1/2016 | Donley et al. | |
| 2016/0048403 A1 | 2/2016 | Bugenhagen | |
| 2016/0119256 A1 | 4/2016 | Wang et al. | |
| 2016/0127169 A1 | 5/2016 | Rosa De Sousa Teixeira et al. | |
| 2016/0127975 A1 | 5/2016 | Hu et al. | |
| 2016/0269925 A1 | 9/2016 | Chou et al. | |
| 2016/0330140 A1 | 11/2016 | Cook et al. | |
| 2016/0344587 A1 | 11/2016 | Hoffmann | |
| 2016/0366014 A1 | 12/2016 | Koo | |
| 2017/0017510 A1 | 1/2017 | Itoh | |
| 2017/0034756 A1* | 2/2017 | Faccin | H04W 28/08 |
| 2017/0086049 A1 | 3/2017 | Vrzic | |
| 2017/0086111 A1 | 3/2017 | Vrzic | |
| 2017/0142206 A1 | 5/2017 | Kodaypak et al. | |
| 2017/0311228 A1* | 10/2017 | Zavesky | H04W 48/04 |
| 2017/0324612 A1 | 11/2017 | Perez et al. | |
| 2018/0070262 A1 | 3/2018 | Nakano et al. | |
| 2018/0206159 A1 | 7/2018 | Vrzic et al. | |
| 2018/0213453 A1 | 7/2018 | Vrzic et al. | |

FOREIGN PATENT DOCUMENTS

| | | |
|---|---|---|
| CN | 102043676 A | 5/2011 |
| CN | 103081525 A | 5/2013 |
| CN | 103491129 A | 1/2014 |
| CN | 104202264 A | 12/2014 |
| CN | 104219127 A | 12/2014 |
| CN | 104253770 A | 12/2014 |
| CN | 104270416 A | 1/2015 |
| CN | 104410672 A | 3/2015 |
| CN | 104579732 A | 4/2015 |
| CN | 104811923 A | 7/2015 |
| EP | 2874448 A1 | 5/2015 |
| EP | 3107249 A1 | 12/2016 |
| EP | 3116175 A1 | 1/2017 |
| WO | 02060192 A2 | 8/2002 |
| WO | 2013082245 A1 | 6/2013 |
| WO | 2015118875 A1 | 8/2015 |
| WO | 2015122177 A1 | 8/2015 |
| WO | 2015133124 A1 | 9/2015 |

OTHER PUBLICATIONS

International Search Report dated Nov. 24, 2016 for corresponding International Application No. PCT/CN2016/099228 filed Sep. 18, 2016.
3GPP TR 22.891 entitled Study on New Services and Markets Technology Enablers.
ETSI GS NFV 001 entitled "Network Function Virtualization (NFV); Use Cases", Oct. 2013.
ETSI GS NFV 002 entitled "Network Function Virtualization (NFV); Architectural Framework", Oct. 2013.
Hang Zhang et al.,"5G Wireless Network: MyNet and SONAC",IEEE 0890-8044/15, Jul. 8, 2015 (Year: 2015),total 10 pages.
Huiling Zhao et al., "Network Virtualization and Network Function Virtualization",ZTE Technology Journal,dated Mar. 2014,total 4 pages.

* cited by examiner

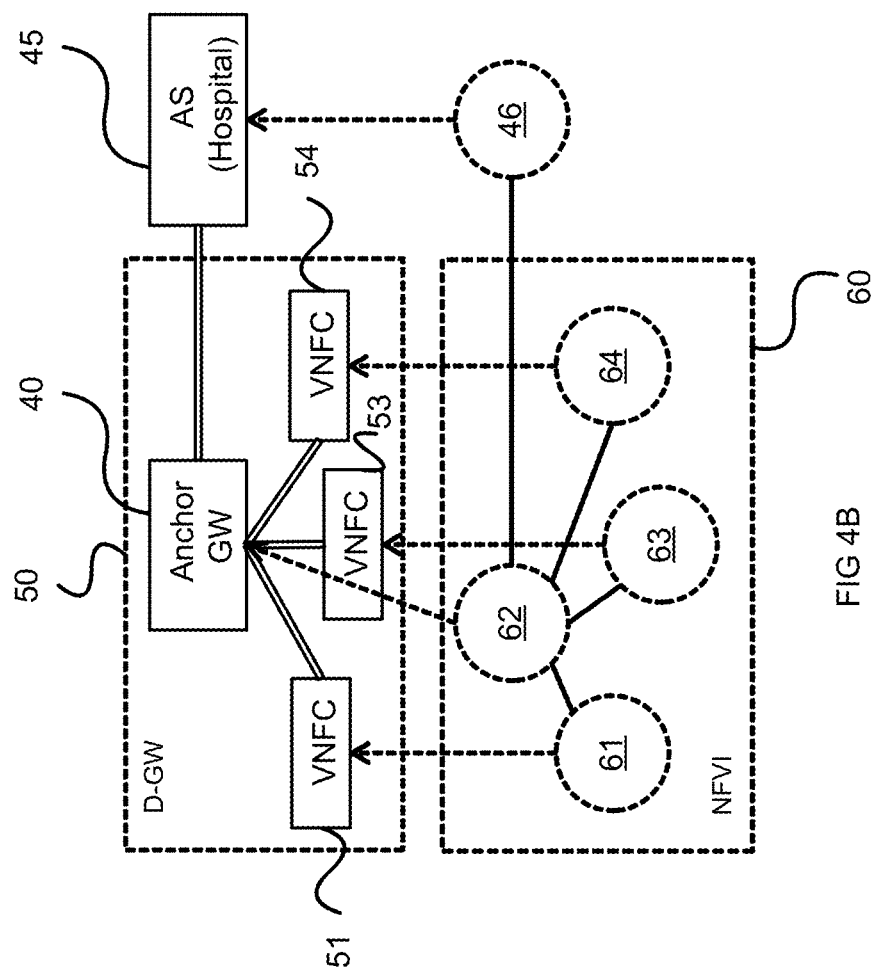

SYSTEM AND METHODS FOR RELIABLE COMMUNICATION WITH MOBILITY ALONG A PREDICTABLE ROUTE

CROSS-REFERENCE TO RELATED APPLICATIONS

This application claims the benefit of priority to U.S. Patent Application Ser. No. 62/220,682 entitled "SYSTEM AND METHODS FOR RELIABLE COMMUNICATION WITH MOBILITY ALONG A PREDICTABLE ROUTE" filed Sep. 18, 2015, and U.S. Patent Application Ser. No. 62/255,101 entitled "DISTRIBUTED GATEWAYS" filed Nov. 13, 2015, both of which are hereby incorporated by reference in their entirety.

FIELD OF THE INVENTION

The present invention pertains to the field of communication networks, and in particular to a system and method for providing reliable communication with mobility.

BACKGROUND

Communication networks enabled by technologies such as Network Function Virtualization and Software Defined Networking, may be flexibly organized so as to serve various customer demands. In building advanced networks, such as those to support future developments in wireless networks (including next generation, or so-called Fifth Generation (5G) wireless networks), network slicing provides the ability to create isolated virtual networks over which different traffic flows can travel isolated from each other. However, managing variable and competing demands on a potentially large network scale is a complex proposition requiring an effective architecture and management thereof.

For example, network operators may have limited resources to service all customer demands over existing infrastructure. Networks are typically built with the recognition that not all users will require service at any given point, and therefore cannot provide full service to all users at the same time. However, sometimes mission critical communication services are required, for example in the case of a medical or other emergency.

Mobile telemedicine makes use of wireless network technologies in order to provide mobile medical care in emergency situations. In some situations, this could be provision of medical care in a pre-hospital setting, such as in a moving ambulance. In other situations, medical care in remote settings, even while not mobile, may require, or at least be augmented by, the provision of services that rely upon a mobile network connection.

As a patient is transported to the hospital, it is sometimes desirable to enable paramedics to transmit the patient's medical data to hospital staff. Although basic health data, such as heart rate etc., can be transmitted over a low bandwidth connection, other data may require both high bandwidth and high reliability of service. This data can include high resolution images and high quality diagnostic audio and video. Two-way video-conferencing between ambulance personnel and hospital staff may also be required.

Although some mobile telemedicine services have already been deployed using third and fourth generation mobile communication systems, enhancements are required to support high quality diagnostic imaging and other bandwidth intensive applications, especially in high mobility scenarios. Current technologies can only partially support mobile telemedicine services due to insufficient bandwidth and lack of support for high mobility services which provide a consistent and low level of latency. Accordingly, there is a need for improved networking services which can provide sufficient bandwidth and coverage as well as support for high mobility, to provide high throughput, low latency communication services for critical communications, especially in the case of an emergency.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments provide high reliability and responsiveness by dedicating resources both at the Radio Access Network (RAN) and the core to provide high throughput, low latency communication for a critical communication service to one or more mobile devices. Examples will be discussed for one such critical communication service involving an ambulance traveling to a hospital, referred to as a mobile telemedicine or mobile health (m-Health) service. However it should be appreciated that this is just one example of a critical communication service which requires high reliability and low latency for a mobile device, and that the methods and systems described herein can be utilized for other services with similar requirements. Radio resources can be allocated to the machines in the ambulance as and where needed to guarantee the required quality of service (QoS). Further, as the route an ambulance will follow to the hospital is known or can be predicted, this information is exploited by embodiments to further reduce communication delay by instantiating Virtual Network Functions (VNFs) closer to the edge where and when they are needed, or likely to be needed. Further, end-to-end paths can be configured in advance between each access point and an application server at the hospital. In some embodiments, core network functions can be isolated from other traffic in the network so that the performance of the critical communication service is not impacted by other services. In some embodiments low latency can be further enhanced by customized processing of the traffic.

In a first aspect of the present invention, there is provided method for providing network service along a predicted route. Such a method includes receiving a network service request for a mobile device having a predicted route. Such a method further includes determining access points along the predicted route. Such a method further includes instantiating and configuring virtual network functions associated with the access points along the predicted route. Such a method further includes activating instantiated virtual network functions associated with the access points along said predicted route before the mobile device connects to each access point in order to continually provide the network service as the mobile device moves. In some embodiments such a method further includes performing path configuration between the access points along the predicted route and a destination node for the network service. In some embodiments activating instantiated virtual network functions associated with the access points along the predicted route before the mobile device connects to each access point includes activating an instantiated virtual network functions as the mobile device approaches the serving area of an access point. Such an embodiment further includes de-activating an instantiated virtual network functions associated with the access points along said predicted route as the mobile device leaves the serving area of each access point. In some embodiments instantiating virtual network functions includes establishing a distributed gateway for serving the mobile device along the predicted route by instantiating virtual network function components as local gateways of the distributed gateway at network infrastructure along the predicted route. Some embodiments further include configuring the virtual network functions with the user equipment context. In some embodiments determining access points includes receiving an indication of the access points which have serving areas along the predicted route. Some embodiments further include receiving an indication that the mobile device has deviated from the predicted route; and adjusting the state of network functions to compensate for the deviation.

Another aspect provides a method of supplying a mobile communication service. Such a method includes instantiating and configuring network functions along a predicted route. Such a method also includes establishing and configuring network paths from access points along the predicted route to a destination node. Such a method also includes changing the state of the network functions depending on the location of a mobile device in order to supply the mobile communication service. Some embodiments further include distributing data to appropriate functions as needed as the mobile device moves along the predicted route. In some embodiments instantiating and configuring network functions includes instantiating virtual functions within nodes along the predicted route in advance of the mobile device approaching the serving area of access points associated with the nodes. In some embodiments changing the state of the network functions includes activating instantiated functions before the mobile device connects to access points associated with the nodes. In some embodiments activating instantiated functions includes activating the functions before the mobile device needs to connect to access points in order to ensure a seamless handover; and changing the state of the network functions includes de-activating instantiated functions as the mobile device leaves the serving area of access points associated with the hosts. In some embodiments a plurality of network functions are active concurrently such that multiple access points serve the mobile device at any given time. In some embodiments establishing and configuring network paths includes configuring redundant user plane paths between the destination node and the access points. In some embodiments establishing and configuring network paths includes configuring user plane paths prior to the mobile device reaching the serving area of an access point, to ensure there are no delays in providing an end-to-end service between the mobile device and the destination node. In some embodiments the destination node is an application server. In some embodiments application server functionality is instantiated within the network functions to reduce the amount of data which needs to be transmitted between the network functions and the application server. Some embodiments further include determining the predicted route for a mobile device. In some such embodiments determining the predicted route includes receiving a notification as to which access points have serving areas along the predicted route. In some embodiments changing the state of the network functions includes activating a plurality of instantiated and configured network functions to act as local gateways for a plurality of access points which simultaneously serve the mobile device. In such embodiments downlink data is transmitted from the destination node to the local gateways for transmission to the mobile device; and uplink is received by each of the plurality of access points which simultaneously serve the mobile device and forwarded to the destination node via the local gateways. In some embodiments changing the state of the network functions includes receiving measurement reports from a plurality of access points. Such embodiments further include determining a serving cluster from the measurement reports and the predefined route. Such embodiments further include activating non-active local gateways for access points in the determined serving cluster and deactivating local gateways for access points which leave the serving cluster. In some embodiments instantiating and configuring network functions along a predicted route includes instantiating an Anchor Gateway function and a scheduler function in a first node and a plurality of Local Gateway functions, with each local gateway associated with an access point; wherein the scheduler schedules data transmission for each access point. In some embodiments the first node further includes a Packet Data Convergence Protocol function for implementing a Packet Data Convergence Protocol between each access point and the mobile device. In some embodiments encrypted data is distributed to each active local gateway and transmitted to the mobile device from each access point according to scheduling information sent by the scheduler. In some embodiments the Packet Data Convergence Protocol distributes the security keys to each local gateway in the serving cluster simultaneously. In some embodiments the serving cluster includes more than one AP which serves the mobile device using coordinated transmissions. In some embodiments the serving cluster includes more than one AP which serves the mobile device using un-coordinated transmissions. In some embodiments the serving cluster includes more than one AP which serves the mobile device using different radio access technologies. In some embodiments the method further includes establishing a potential serving cluster of APs and determining an actual serving cluster of APs.

Another aspect provides session management network function. Such a session management function includes a network interface for receiving a network service request and for transmitting instructions. Such a session management function further includes a a processor and a non-transient memory for storing instructions which when executed by the processor cause the session management network function to instantiate and configure network functions along a predicted route. Such instructions also cause the session management function to establish and configure network paths from access points along the predicted route to a destination node. Such instructions also cause the session management function to change the state of the network functions depending on the location of a mobile device in order to supply the mobile communication service. In some embodiments the session management function can form part of a software defined networking controller. In some embodiments session management function can also form part of another network function. In some embodiments the instructions which cause the session management network function to instantiate and configure network functions includes instructions to instantiate virtual functions within nodes along the predicted route in advance of the mobile device approaching the serving area of access points associated with the nodes. In some embodiments the instructions which cause the session management network function to change the state of the network functions includes instructions to activate instantiated functions before the mobile device connects to access points associated with the nodes. In some embodiments the instructions which cause the session management network function to activate instantiated functions includes instructions to activate the functions before the mobile device needs to connect to access points in order to ensure a seamless handover. In some embodiments changing the state of the network functions includes de-activating instantiated functions as the mobile device leaves the serving area of access points associated with the hosts. In some embodiments a plurality of network functions are active concurrently such that multiple access points serve the mobile device at any given time. In some embodiments the instructions which cause the session management network function to change the state of the network functions includes instructions which cause the session management function to determine a serving cluster based on measurement reports received from a plurality of access points and based on the predefined route. In such embodiments the session management function activates non-active local gateways for access points in the determined serving cluster and deactivates local gateways for access points which leave the serving cluster.

BRIEF DESCRIPTION OF THE FIGURES

Further features and advantages of the present invention will become apparent from the following detailed description, taken in combination with the appended drawings, in which:

FIGS. 4A and 4B illustrates a distributed virtual gateway (D-GW) according to embodiments of the present invention.

It will be noted that throughout the appended drawings, like features are identified by like reference numerals.

DETAILED DESCRIPTION

Figure 1:
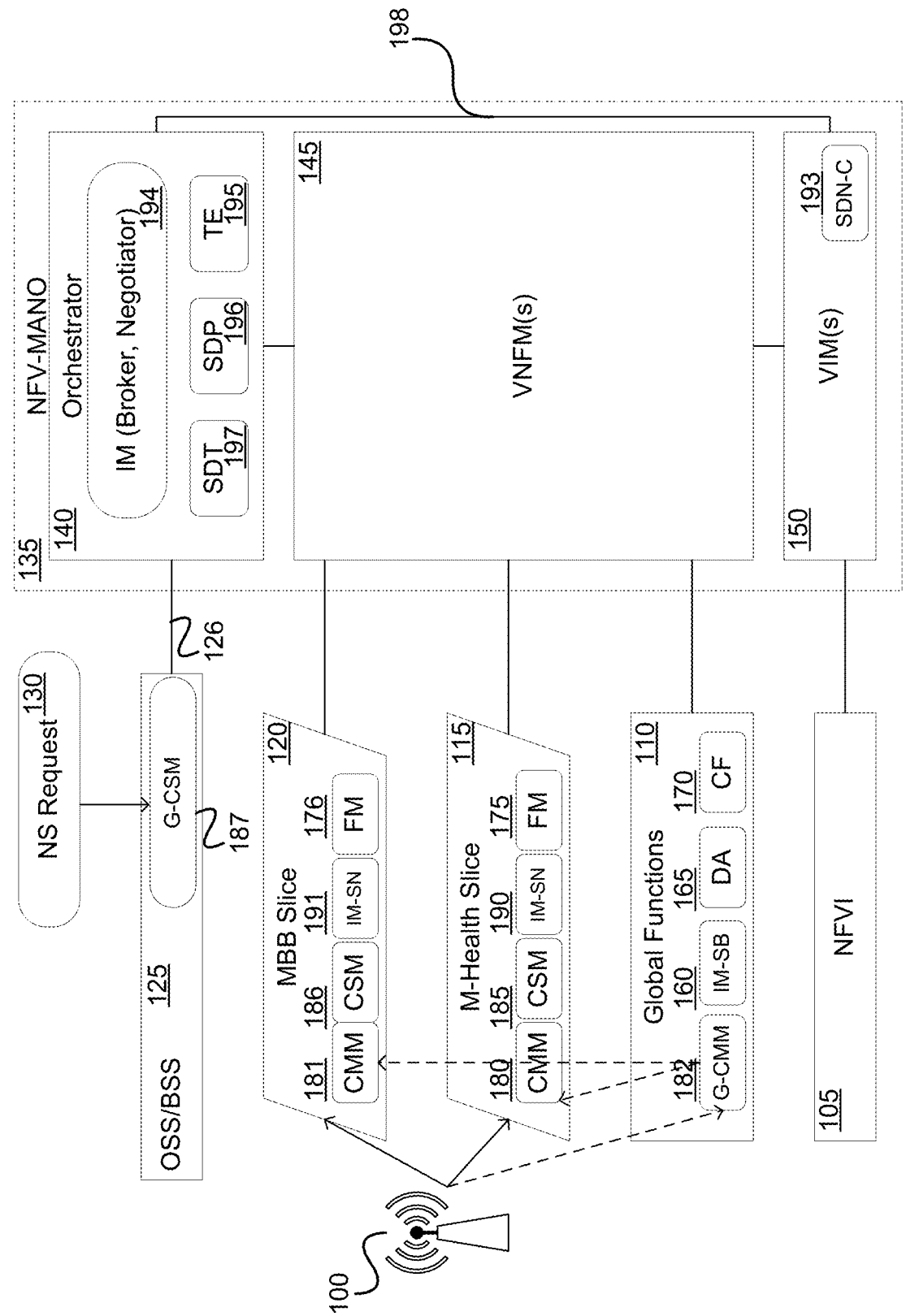
FIG. 1 illustrates an overview of the communication network architecture in accordance with embodiments of the present invention.

As used herein, a "network" or "communication network" may service various devices, including but not necessarily limited to wireless devices. Such a network may include a radio access portion and backhaul portion. The network may further include various virtualized components. Those skilled in the art will appreciate that when round-trip latency limitations are too stringent for current third and fourth generation (3G/4G) mobile network deployments, next generation (so called fifth generation, 5G) networks may be used for some telemedicine implementations. Through the use of technologies such as Network Function Virtualization (NFV), Software Defined Protocols (SDP), Software Defined Topology (SDT) and Software Defined Networking (SDN), a flexible network architecture can be created to support such services. Some networks may provide the flexible architecture through the use of Network Slicing, by creating a slice that provides an Ultra-Reliable Low Latency (URLL) slice, while other implementations can do so without creating isolated network slices.

Examples are provided herein for a mobile telemedicine application (referred to as m-Health) which requires a reliable, low latency service which accommodates the mobility of mobile devices. However, it should be noted that the systems and methods discussed herein can be extended to other communication services with similar requirements. It should be further understood that the term "mobile device" is used to refer to devices that connect to mobile networks. A mobile device may not, itself, be mobile. In the context of the current discussions, although an ambulance is mobile while on route to a hospital, it may not be mobile at various points along the path, even though it may need to take advantage of the systems and methods disclosed below. Furthermore, a remote medical clinic may make use of the wireless infrastructure to connect to another hospital in remote and sparsely populated regions. In addition, it is noted that an ambulance may include multiple mobile devices. In other embodiments, an ambulance may include a gateway mobile device which communicates with a mobile network on behalf of a plurality of devices each of which require communication sessions. Prior to discussing embodiments for providing such critical communication services, an embodiment of a general network architecture is discussed.

In some embodiments, network slicing relates to the ability of a network, such as a 5G communication network accessible by wireless devices, to provide multiple logical network slices on demand, with each network slice operating as a substantially separate network viewed as a service. The capabilities and operating parameters of each network slice may be customized to the service requirements. Configuration of the network slices may be based on software defined networking, network function virtualization and network orchestration.

For example, a carrier typically operates a network as a collection of computing and connectivity resources. To ensure that services with dramatically different network usage profiles are accommodated without massively over-provisioning the networks, the underlying network resources can be used as a base upon which network slices are instantiated. Each network slice can operate as a virtualized private network dedicated to a service or a type of traffic. Traffic can be contained within the slice so that there is a degree of traffic isolation between two slices. The parameters of each slice can be matched to a service, so that, for example, a slice used for machine-type communication (MTC) devices that is used for reporting usage and status information from a set of connected utility meters will be differently selected than the parameters of a slice that is used for mobile broadband (MBB) communications. In the above example, an MTC slice may be designed to support a large number of connected devices that each transmit small delay-insensitive messages, while the MBB slice, or a dedicated slice for applications which require ultra reliable low latency such as the m-Health example discussed herein, may be designed for a smaller number of connected devices, but provisioned to provide each of the devices with higher data rate and low latency connections. Through the use of Network Function Virtualization (NFV) computing resources can be used to create a configurable set of network functions within a slice, where needed. This can provide the slice a logical topology specific to its needs. A network slice (as defined in 3GPP TR 22.891 entitled "Study on New Services and Markets Technology Enablers" not yet released) is a collection of logical network functions that supports the communication service requirements of a particular network service. One use of network slicing is in the core network. Through the use of network slicing, different core networks can be run on the same or overlapping physical set of network and computing resources. Network slicing can also be used to create independent virtual networks dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In a 3G/4G mobile network, a UE is associated with a Mobility Management Entity (MME) during the attach process. The MME associated with the mobile device is selected from a pool of MMES by a selection function in a network infrastructure component such as the eNodeB. In contrast with a network that must be designed to meet the needs of each wireless device, network slicing allows the instantiation of separate network slices on the network resources. Each slice can be created so that it has characteristics tailored to the particular requirements of a single service. The use of network slices allows for the isolation of different types of traffic, each of which may have different packet processing requirements and Quality of Service (QoS) requirements. In some embodiments, an individual network slice can be used to support services with similar traffic profiles and requirements. Thus, where an URLL slice is created, any service that requires an URLL network could be run in the same URLL slice. Alternately, some services may be considered too important to share resource with other services, and in such a case, the service may be supported in a dedicated slice. The underlying resources, upon which a slice is created, may be commercial-off-the-shelf hardware components through the use of function virtualization approaches, such as NFV. By virtualizing functions at the locations at which they are required, as they are required, the network can flexibly support a plurality of different services without unnecessary deployment of resources.

The Network Function Virtualization (NFV) framework can be used to define a plurality of virtual network functions (VNFs), each of which can correspond to a function enabling operation of a communication network. For example a VNF can provide the functions of a router, switch, gateway, firewall, load balancer, server and the like. As opposed to conventional deployments in which dedicated physical nodes are deployed to carry out specified functions, a virtual function can be instantiated using available computing and connectivity resources. As demand for the function increases, the resources allocated to the function can be increased. If demand for the function decreases or ceases, the function can be scaled down or terminated. The function is virtualized in the sense that it may utilize a set of virtual resources, such as computing, storage and networking resources, rather than utilizing dedicated hardware resources. VNFs may be instantiated on an as-needed basis using available virtual resources. NFV and VNF architecture is described in ETSI GS NFV 001 entitled "Network Function Virtualization (NFV); Use Cases", October 2013, and ETSI GS NFV 002 entitled "Network Function Virtualization (NFV); Architectural Framework", October 2013, for example.

Network slicing is a network management technique in which both compute and connectivity resources in a communications network are divided to create a set of isolated virtual networks. When combined with other techniques such as Network Function Virtualization (NFV), Virtual Network Functions (VNFs) can be instantiated upon generic computing resources to provide specific network functions. This allows different slices of the compute and connectivity resources to be put together into a set of network slices, each of which is isolated from the other slices. The connectivity between these computing resources can be allocated so that traffic associated with each network operator is isolated from another. Isolation of the resource usage and traffic within a slice allows for different services to be isolated on different slices. Through the use of NFV, the capability and location of the network functions can be adjusted to suit the specific needs of each operator within their allocated slice. A first network slice may be configured to suit the needs of a Machine Type Communication (MTC) service that generates large number of short transmissions, where MTC devices do not need ultra-reliable connections because reliability can be designed at the application layer. This network slice would differ in its configuration and resource demands from a network slice that is designed to serve the needs of User Equipment connecting for the purposes of an enhanced-Mobile-Broadband (eMBB) connection. By providing different slices for different services, an operator can ensure that the specific needs of a service are met without requiring the overprovisioning of resources to each connection that would be required if a single slice was used for all services. It will be understood that the slices created to serve the needs of different services may be built upon the resources allocated to the network operator within a slice that isolated the network operator from other network operators on a set of resources associated with a service provider.

It is anticipated that network slicing techniques, as well as Network Function Virtualization techniques will be employed in future generations of mobile networks, including so-called fifth generation (5G) communications networks that are used to provide network services to mobile devices such as UEs.

According to embodiments of the present invention, the communication network architecture can be based on an NFV framework. The NFV Management and Orchestration (MANO) entity is used to instantiate the necessary network functional components in order to suitably provide the service indentified by a Network Service (NS) request. The instantiation of an NS request is described by a Virtual Network Function Forwarding Graph (VNFFG), which defines the set of network functions that are required to provide the requested service. The VNFFG contains a Network Forwarding Path (NFP) that defines a sequence of actions that are to be performed, for example by a collection of VNFs, to provide the requested service. It should be understood, as noted above, that while some of the discussion is directed to the use of network slicing, the use of slicing is not required, so long as sufficient network resources can be allocated to provide the desired service (e.g. an URLL service).

FIG. 1 illustrates an overview of a communication network architecture in accordance with embodiments of the present invention. The NFV-MANO entity 135 includes an Orchestrator function 140, a Virtual Network Function Manager (VNFM) function 145 and a Virtual Infrastructure Manager (VIM) function 150. According to embodiments, the functionality of the Orchestrator function 140, VNFM function 145 and VIM function 150 can be as defined in ETSI GS NFV 001 and ETSI GS NFV 002, for example.

According to embodiments, the VIM function 150 is configured to manage the Network Function Virtual Infrastructure (NFVI) 105 which can include physical infrastructure, virtual resources and software resources in an NFV based network. For example, physical infrastructure can include servers, storage devices and the like and virtual resources can include virtual machines. According to embodiments, there can be a plurality of VIM functions instantiated within a particular NFV architecture, wherein each VIM function is responsible for the management of its respective NFVI.

According to embodiments, the VNFM function 145 can be configured to manage the VNFs and can manage the lifecycle of the VNFs. For example, the VNFM function 145 can create, maintain and terminate VNF instances, which can be installed on virtual machines that are created and managed by the VIM function 150. The VNFM function 145 can also be configured to provide fault, configuration, accounting, performance and security management (FCAPs) of the VNFs. In addition, the VNFM function 145 can be configured to scale-up and scale-down one or more of the VNFs which can result in the scaling-up and scaling-down of the usage of the central processor(s) that is providing the computational power for the realization of the VNFs. In some embodiments, each VNFM function manages a separate VNF or a single VNFM function manages multiple VNFs.

According to embodiments, the Orchestrator function 140 can be configured to coordinate, authorize, release and engage the NFVI resources by interaction with the VIM function 150. The Orchestrator function 140 is further configured to create end to end service between different VNFs by interaction with the VNFM function 145.

With further reference to FIG. 1, a plurality of network slices and a Global Control Plane 110 used for network slice management in accordance with embodiments of the present invention are illustrated. The Global Control Plane 110 controls functions across multiple and potentially all the network slices. The Global Control Plane 110 may be regarded as a separate network slice in some embodiments. The illustrated network slices include a Mobile Broadband (MBB) network slice 120 and an m-Health slice 115. It should be appreciated that other types of network slices may be used, for example a slice can be created for each virtual network. Furthermore, a plurality of slices can be established for each type.

In various embodiments, both the Global Control Plane functions and each network slice specific control plane function may be instantiated at an arbitrary location in the network by the NFV-MANO entity in order to provide connection management across a plurality or all of the network slices. The location of these functions may depend on performance factors such as delay requirements of different network services being provided.

The functions configured within the Global Control Plane 110 can include the Global Connection and Mobility Management (G-CMM) function 182, Infrastructure Management (IM) function, which can contain a broker function and a negotiator function for obtaining computing, storage and network resources for core network functions. In some embodiments, the IM function contains a Spectrum Broker (SB) function (IM-SB) 160 which is configured to obtain spectrum resources. The Global Control Plane 110 can also include a Data Analytics (DA) function 165 and Cache and Forwarding (CF) function 170. The DA function 165 is responsible for collecting statistics across multiple and potentially all network slices. The CF function 170 is responsible for management of the cached content across multiple and potentially all network slices.

In more detail, the G-CMM function 182 is responsible for maintaining a list of the instantiated network slices and the parameters associated with each network slice (e.g. Operator ID, service type, etc.). The G-CMM function 182 is further responsible for maintaining a pool of Connection and Mobility Management (CMM) functions, wherein each CMM function is instantiated as a local or network slice specific function. The G-CMM function 182 is further responsible for initial association to a network slice.

In embodiments, the network architecture further includes a Global Customer Service Management (G-CSM) function 187 which is configured to receive the NS Requests 130 and act upon same through communication with the Orchestrator function 140 of the NFV-MANO entity 135. The G-CSM function 187 is responsible for maintaining a pool of Customer Service Management (CSM) functions, wherein each CSM function is instantiated as a local or network slice specific function. The G-CSM function 187 is further responsible for keeping track of charging, for example billing, across multiple or potentially all network slices. The G-CSM function 187 can be configured to monitor network slices and provide feedback to the Orchestrator function 140 about the performance of a network slice, thereby enabling optional fine tuning of the network and computing resources, as managed by the VNFM function 145 and the VIM function 150.

According to embodiments, the G-CSM function 187 can be functionally integrated within the Operational Support System/Business Support System (OSS-BSS) 125. The OSS can include functions that support back-office activities which aid in operating a communication network, as well as provisioning and maintaining customer services and the like. The BSS can include functions that support customer-facing activities, for example billing order management, customer relationship management, call centre automation and the like. In this embodiment, the G-CSM function 187 can communicate with the Orchestrator function 140 using the Os-Ma-nfvo interface 126, which provides communication between the OSS/BSS 125 and the Orchestrator function 140.

According to some embodiments, the G-CSM function 187 can be instantiated within the network but external to the OSS/BSS 125. In this configuration, another interface, which may not be defined with the NFV framework, is configured in order to provide communication between the G-CSM function 187 and the Orchestrator function 140.

With further reference to FIG. 1, the various network slices, for example the MBB slice 120 and m-Health slice 115, may each include their own network slice specific CMM function 181, 180 and CSM function 186, 185, and additionally may be managed by the Global Control Plane 110. The network slice specific CMM functions 181, 180 are referred to and controlled by the G-CMM function 182 operating within the Global Control Plane 110. Each network slice further includes a Flow Management (FM) function 176, 175 which can be configured to tune the performance of the network slice by dynamically analyzing, predicting and regulating behaviour of data transmitted over that network slice. In some embodiments, the FM functions can include a Traffic Engineering (TE) component. In addition, each of the network slices can further include an Authentication and Authorization (AA) function (not shown), which may provide authorization of access of a user equipment (UE) to use of the communication resources of the particular network slice.

In some embodiments, each network slice further includes a network slice specific IM function containing a Spectrum Negotiator (SN) function (IM-SN) 191 190. In some embodiments, the IM-SN function is not contained within the network slice but instead resides within the Cloud Radio Access Network (C-RAN) functions or a global function.

Although only a single Access Point (AP) 100 is shown for clarity, it will be readily understood that multiple Access Nodes are supported. In some embodiments, a plurality of access nodes supporting different radio access technologies is also supported. In embodiments, APs throughout the various figures include one or more transmit/receive points (TRPs), which can include base stations such as Node B, evolved Node B, 5G Node-B, or Remote Radio Units (RRUs) operatively coupled to one or more Baseband Units (BBUs) or the like. Furthermore the term AP can include multiple transmission points (TPs) and/or receive points (RPs).

Figure 2:
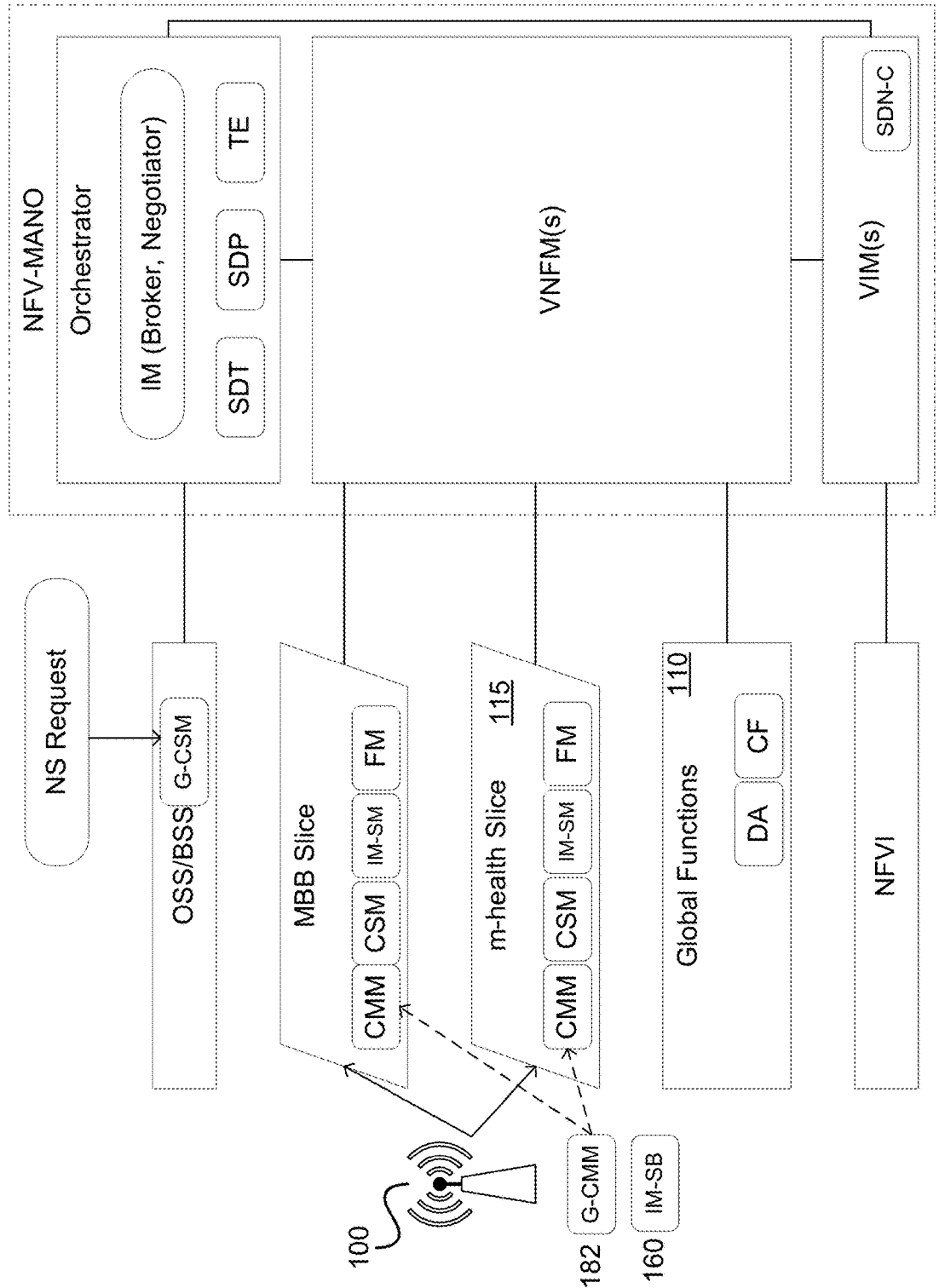
FIG. 2 illustrates an overview of the communication network architecture in accordance with embodiments of the present invention.

With reference to FIG. 2, the G-CMM function 182 which can control or interact with the CMM function in a plurality of network slices can be instantiated close to the AP 100. In this embodiment, the IM-SB function 160 can also be instantiated close to the AP 100 along with the G-CMM function 182. In some embodiments, the processing functions of an AP may be physically separated from the radio head, and instantiated within a data center. In such embodiments, it is possible that a single G-CMM function 182 can be instantiated within a data center that also provides the processing functions for a plurality of APs.

Figure 3:
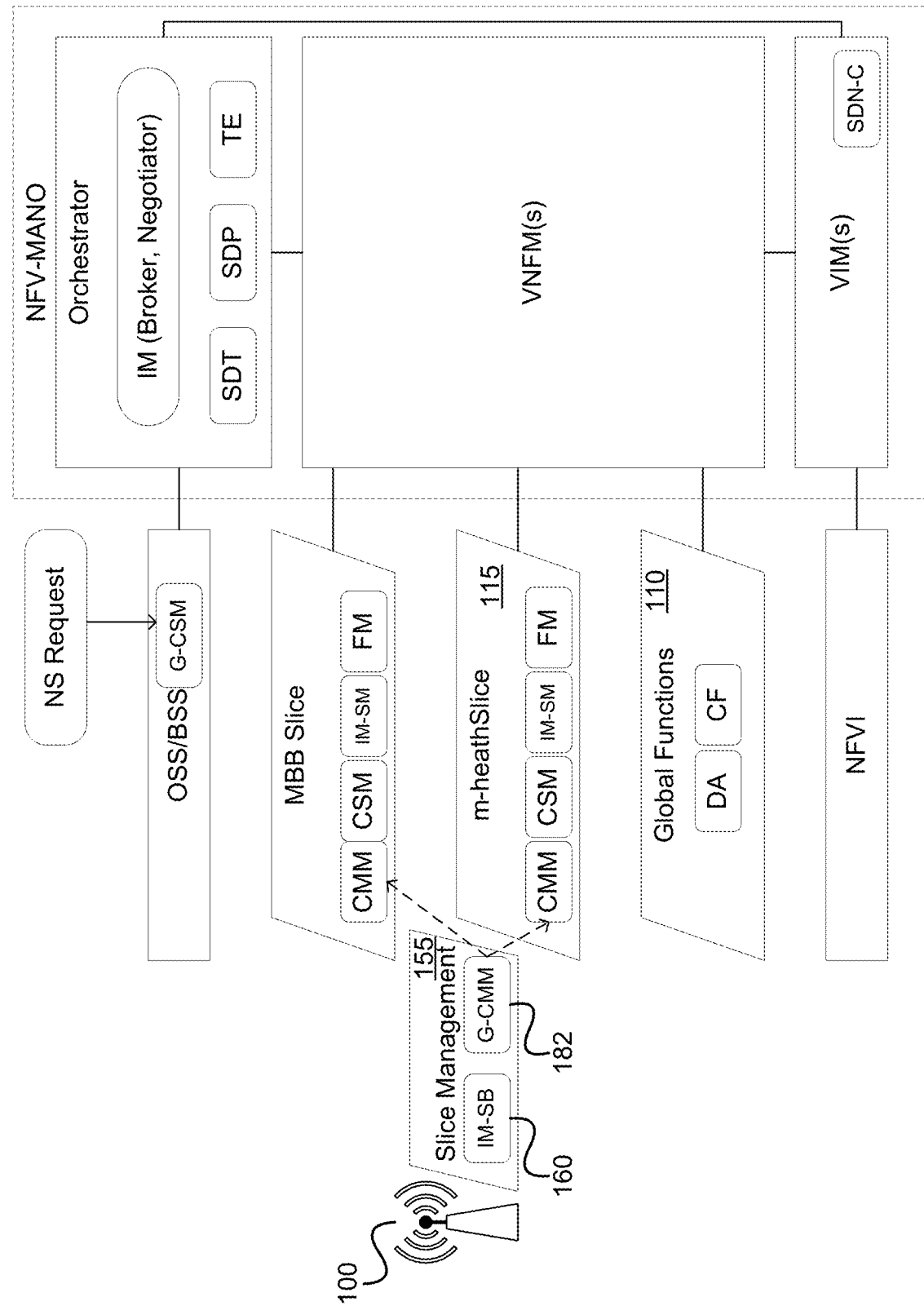
FIG. 3 illustrates an overview of the communication network architecture in accordance with embodiments of the present invention.

With reference to FIG. 3, a Slice Management control plane function 155, which includes the G-CMM function 182 and the IM-SB function 160, is instantiated within the network architecture. The Slice Management control plane function 155 can be located within the RAN or close to the Core network/RAN boundary. In some embodiments, the Slice Management control plane function 155 can include other functions, such as the G-CSM function 187 and/or the DA function 165.

In accordance with embodiments, the NFV-MANO entity 135 further instantiates NFV management plane functions that define the network topology for an NS request, determine the transport protocols to be used across links and determine the physical links between different network functions used by the network service. In some embodiments, these NFV management plane functions are integrated within the Orchestrator function 140 and include a Software Defined Topology (SDT) function 197, a Software Defined Protocol (SDP) function 196, a Software Defined Resource Allocation (SDRA) function 192, and an IM function 194.

Software Defined Networking (SDN) is a network management technique that allows a network management entity (e.g. an SDN Controller or SDN-C) to implement an architectural framework to create intelligent programmable networks, where the control planes and the data planes can be decoupled, network intelligence and state are logically centralized, and the underlying network infrastructure is abstracted from the application. In embodiments of the present invention, the Orchestrator function form a logical network topology, for example as created via the SDT function. The SDT function can be combined with the SDN and SDP function to create a customized virtual network, wherein a virtual network is a collection of resources virtualized for a particular service.

In some cases, SDN allows for the management of network services through abstraction of lower-level functionality. Control functions may be separated from forwarding functions, for example by controlling the forwarding nodes from a control element. NFV can facilitate the virtualization of entire classes of network node functions. VNF can comprise or operate on one or more virtual machines running on relatively generic servers or computing equipment, such as commercial off-the-shelf hardware capable of being configured to provide a variety of functionalities, as opposed to dedicated hardware for a given functionality.

According to embodiments, the SDT function 197 is instantiated as part of the Orchestrator function 140. The SDT function 197 is configured to determine the Point of Presence (PoP) for each VNF in the VNFFG provided by the G-CSM function 187. The SDT function 197 is also configured to determine the logical links between the VNFs in the VNFFG.

According to embodiments, the SDRA function is configured to allocate the physical link resources for each logical link defined in the VNFFG. The SDRA function may utilize other functional components, such as the SDN-C function 193 and the TE function 195. The SDN-C function 193 is instantiated within each VIM function 193 and is configured to provide the forwarding rules to the forwarding switches, for example routers and the like, within the physical network architecture. The TE function 195 is instantiated within the Orchestrator function 140 and is configured to perform path computation between the source node and destination node while attempting to tune the path by dynamically analyzing, predicting and regulating behaviour of data transmission. In one embodiment, the TE function 195 performs only the path computation between the source node and destination node. The forwarding rules are then sent to the SDN-C function via the VIM function using the Or-Vi interface 198. In another embodiment, the TE function 195 performs the path computation and also determines the capacity bounds for each physical link for each network slice. The capacity bounds are sent to the Flow Management (FM) function in each network slice, which performs the flow splitting function to ensure that the capacity bounds are not violated. The capacity bounds are sent on the Or-Vi interface to the VIM function 150, which then sends the rules to the SDN-C function 193 and the FM function. In general, the TE and FM calculations can be distributed in different ways between the TE function 195 and the FM function (for example FM function 175). The information exchanged between the TE function 195 and the FM function 175 is sent from the Orchestrator function 140 to the VIM function 150 on the Or-Vi interface 198. The VIM function 150 sends the rules to the SDN-C function 193 and the SDN-C function 193 can send information to the FM function 175 for FM related calculations. Those skilled in the art will appreciate that at either extreme of the distribution of the functionality between TE function and FM function, one of the entities can be assigned all responsibilities, while the other is assigned none. It should be noted that both of these extreme cases along with any blend between the two can be supported. However, it should be appreciated that the other embodiments utilize a session management network function (SMNF), or a session management entity (SME) function, to provide the functionality of the SDN-C 193 and the TE function 195. Such an SMNF/SME may reside within the NFV-MANO 135 or alternatively as a global function 110. In other embodiments, an SMNF/SME may be instantiated for each slice, for example the m-Health slice 115.

According to embodiments, the SDP function 196 is instantiated as part of the Orchestrator function 140. The SDP function 196 is configured to determine the transport protocol stack for each of the logical links defined in the VNFFG.

Figure 4A:
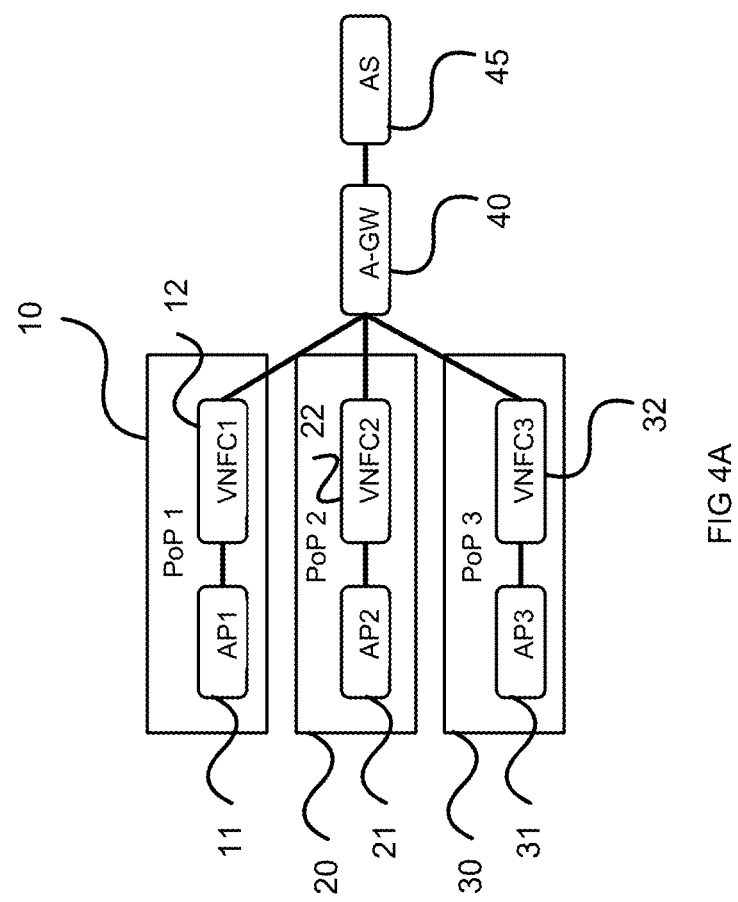

In a 3G/4G network, there are gateway (GW) functions that are used to ensure data connectivity to a UE. The GW functions in a 3G/4G network are often statically configured so that other nodes in the network will be aware of an address at which the GW can be reached. As a result, even if the GW is a virtual entity, it is typically an entity that is instantiated at a fixed location using fixed parameters. In a mobile-health, also referred to as a telemedicine, application, it may be preferable to push a gateway function as close to the UE as possible. In 3G/4G network architecture, the GW functions are maintained at a topological distance away from the radio edge so that they can serve the UE regardless of which eNodeB the UE is connected to. This topological distance can introduce a delay which may be observed as a latency in communication. To address this, a virtualized gateway can be pushed towards the radio edge so that latency can be reduced. To keep the virtual GW close to the UE, the GW can be distributed along the radio edge, so that effectively the GW functions specific to the UE move through the network with the UE. Referring to FIGS. 4A and 4B, there is shown a Distributed virtual Gateway (GW) (D-GW) according to embodiments of the present invention. The D-GW 50 (as shown in FIG. 4B) is composed of multiple Virtual Network Function Components (VNFCs), and includes multiple Local GW (L-GW) VNFCs 51 53 and 54 and can include an anchor GW (A-GW) 40. FIG. 4A shows each Local GW VNFC (which is also known as a user plane (UP) GW (UPGW)) associated with an AP that is located at the same PoP as the VNFC. Accordingly, PoP1 10 includes AP1 11 associated with a L-GW illustrated as VNFC1 12, PoP2 20 includes AP2 21 associated with a L-GW illustrated as VNFC2 22, and PoP3 30 includes AP3 31 associated with a L-GW illustrated as VNFC3 32. It should be understood that a single PoP can support more than one AP, in which case a single VNFC can be instantiated at the PoP to support all the APs supported by the PoP. FIG. 4B illustrates a logical mapping between the VNFCs which make up the D-GW 50 and a more generalized view of the NFVI 60 which is used for the D-GW 50. So in this example, VNFC 51 is instantiated to provide a L-GW within a host NFVI element 61, the Anchor GW 40 is instantiated within host 62, VNFC 53 is instantiated to provide a L-GW within a host NFVI element 63, and VNFC 54 is instantiated to provide a L-GW within a host NFVI element 64. The Application Server (AS) 45 is instantiated within host 46, which in an m-Health example may be located within a hospital. The A-GW VNFC 40 forwards Downlink (DL) data to each VNFC 51 53 and 54 that is in Active state. Uplink (UL) traffic is received by Active VNFCs and forwarded to the A-GW. In another embodiment, the UL traffic may be sent from each L-GW to the AS directly. Methods and systems for using D-GWs are described in a co-pending U.S. patent application Ser. No. 14/863,286 entitled "Distributed Virtual Gateways" naming Sophie Vrzic and Jaya Rao, filed Sep. 23, 2015, which is hereby incorporated by reference in its entirety.

The A-GW 40 can serve as both an IP anchor and a data plane (or user plane) gateway. A-GW 40 can act as an IP anchor, to support session continuity and preserve an IP address that the AS 45 can direct traffic towards for the duration of session. In some embodiments, the A-GW 40 maintains the same IP address and that it insulates the AS 45 from needing to update the address of any other gateway that the UE connects to as it moves. In some embodiments, the A-GW 40 ensures that the UE maintains the same IP address as it moves along the predicted route. As the mobile device moves with respect to the topology of the network, instantiated, configured and activated VNFCs are positioned to be topologically close to the APs so that they can as L-GWs for the moving device. It should be appreciated that the L-GWs can be instantiated and configured along the route in advance of the arrival of the mobile device, and then activated when the mobile device approaches the service area of the AP associated with the L-GW. The A-GW 40 can further act as a data plane or user plane gateway which is responsible for distributing or pushing data to the plurality of the L-GWs. It should be appreciated that in this capacity, the A-GW 40 can include a point-to-multipoint distribution function, such as a Multimedia Broadcast Multicast Services (MBMS) function, so that it can direct data to a plurality of different L-GWs. Further, it should be appreciated that a D-GW need not include the A-GW. In one such example, the A-GW functionality can be incorporated within the AS. The A-GW 40 can also act as a mobility anchor. The mobility anchor can be considered to act as a Serving GW (SGW) in 3G/4G networks, such as those implementing the LTE standards. The IP anchor function is similar to the Packet Gateway (PGW) in LTE. In some embodiments of the D-GW, the mobility anchor functionality can be distributed and moved closer to the UE (i.e., distributed to L-GW VNFCs) instead of being centralized at the A-GW 40. The IP anchor can be the A-GW 40 in some embodiments. In other embodiments, the IP anchor functionality can also be distributed to the AS and the L-GW VNFCs. In some embodiments, the A-GW 40 can act as a terminating UP Function (TUPF), whereas in other embodiments the L-GW VNFCs act as TUPFs. In some embodiments application server functionality can be instantiated within VNFCs to reduce the amount of data which needs to be transmitted between the VNFCs and the application server, for example using Mobile Edge Computing (MEC) VNFCs.

Examples of using the above described infrastructure to provide critical communication mobile telemedicine (m-Health) will now be discussed. In this example, an ambulance is used to transport a patient to a hospital, and en route a communication session between the hospital and the ambulance is provided. The communication session may have requirements related to reliability and latency. The ambulance may be associated with multiple devices which require communication with a hospital, including a computer running software, various scopes and monitors, as well as telephony equipment for voice or video calls between paramedics and hospital staff. In some embodiments, a single communication session is used to carry the traffic associated with each of these devices. In such an embodiment, the ambulance provides gateway services to the associated devices, and from the perspective of the network, the ambulance is the UE/mobile device. In other embodiments, individual devices can have their own radio connection. Some devices may have their own connections, while others rely upon the ambulance. For simplicity in the following discussion, the ambulance will be treated as the end point of the connection to the radio access network, and reference to the ambulance can generally be taken to refer to both the vehicle and the devices associated with it. Examples will be discussed for providing continuity for an m-Health session, but it should be appreciated that in some embodiments multiple sessions can be established between the ambulance and the application server.

The ambulance makes use of a connection to the mobile network so that data services within the radio access network, and the connection to the application server can be used to provide the telemedicine services. In one such example, the patient's vital signs, along with imaging data can be obtained within the ambulance, with a sufficiently high resolution, this data can be provided to the Application Server (typically associated with the hospital, and accessible to hospital staff), so that analysis of the data (and images) can be provided in real-time to aid the paramedics in administering medical services, and to allow the hospital to allocate resources in anticipation of the patient arrival.

Figure 5:
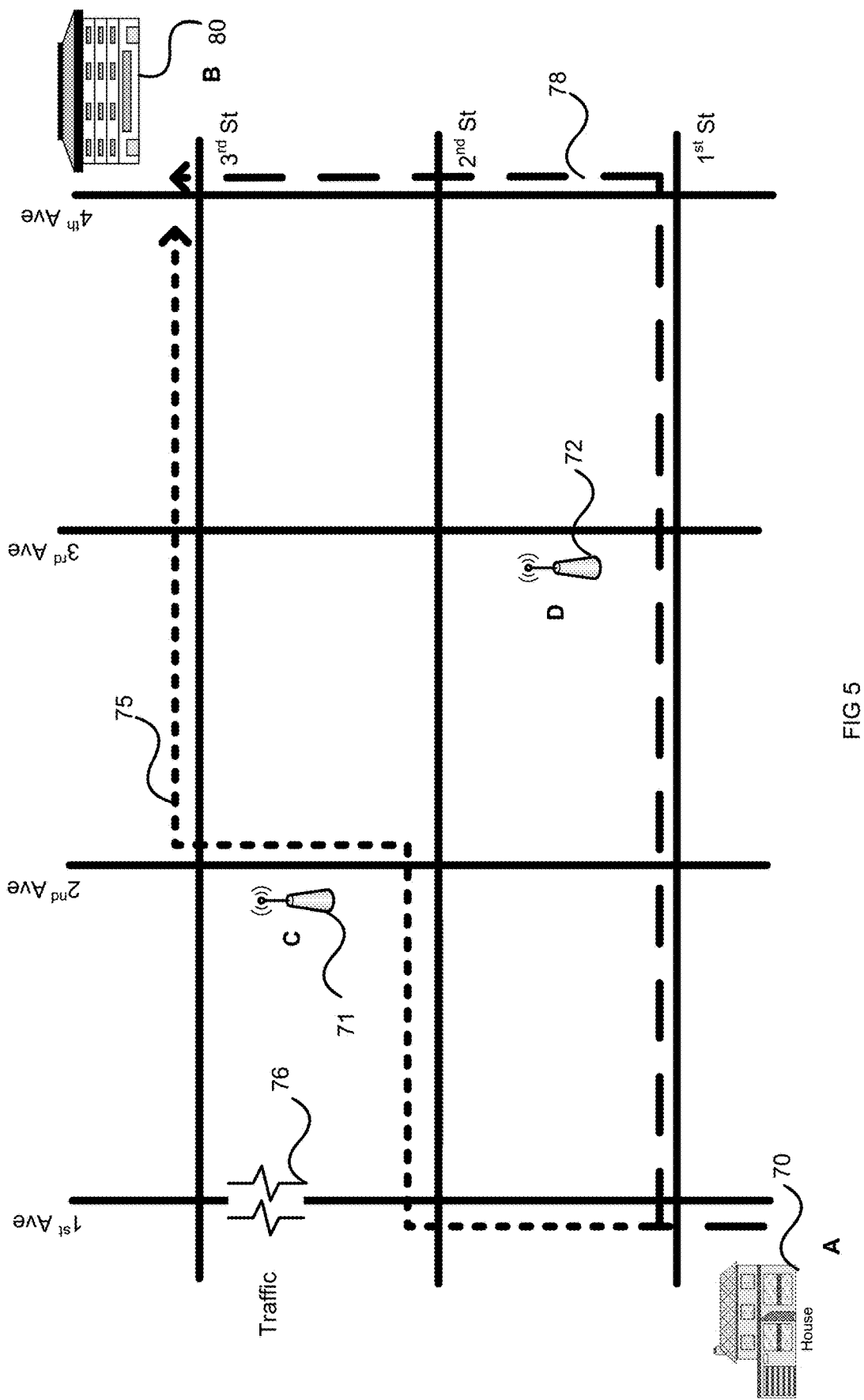
FIG. 5 illustrates an ambulance dispatched to pick up location A which has several possible driving routes to Hospital location B.

Referring to FIG. 5, an ambulance is dispatched to pick up a patient from a house 70 at location A. There are several possible driving routes to the Hospital 80 at location B, of which two (75, 78) are illustrated. There are a number of existing solutions to allow mapping software to select driving routes in accordance with distance, traffic conditions, and predicted travel time and other such factors. These applications can be used to suggest routes to the driver, and to predict the routes that may be taken. By planning routes to avoid hazards such as traffic congestion 76 the travel time of the ambulance can be reduced, and a set of possible paths can be assembled so that virtual functions used by the mobile device (e.g. a D-GW) can be instantiated along the path.

The system can then identify the available infrastructure elements along the identified driving routes based on known network topology. AP 71 at location C and AP 72 at location D are shown as examples of available infrastructure elements along driving routes 75 and 78 respectively. It should be appreciated that any given predicted route may pass through the service areas of these or other APs. With a plurality of identified routes identified, and the resources available along each route identified, routes with sufficient resources to provide various services can be selected for suggestion to a driver. For example, if two identified driving routes have the same predicted travel time, but network resources are more available on one of the two routes, the driver can be prompted to follow the route that has more available network resources.

The VNFCs for the D-GW are proactively instantiated along the route to the hospital. In some embodiments, the system overprovisions the network for possible deviations from the predicted route, which may occur due to the ambulance driver making decisions based on the actual traffic conditions at each intersection. Accordingly, VNFCs will be instantiated, configured and made active at both locations C and D. In other embodiments, VNFCs will be instantiated and configured at both locations C and D after the ambulance is dispatched, to ensure they will be available when needed. As the ambulance approaches the serving area of an AP, the state of an associated VNFC can be made active to ensure a service is available. Once it can be determined (via GPS, triangulation by the network, or other means) that the ambulance has turned away from location D, then resources along potential routes that include location D can be freed up (including changing the state of VNFCs both at D and along potential driving routes that extend from location D).

Figure 6:
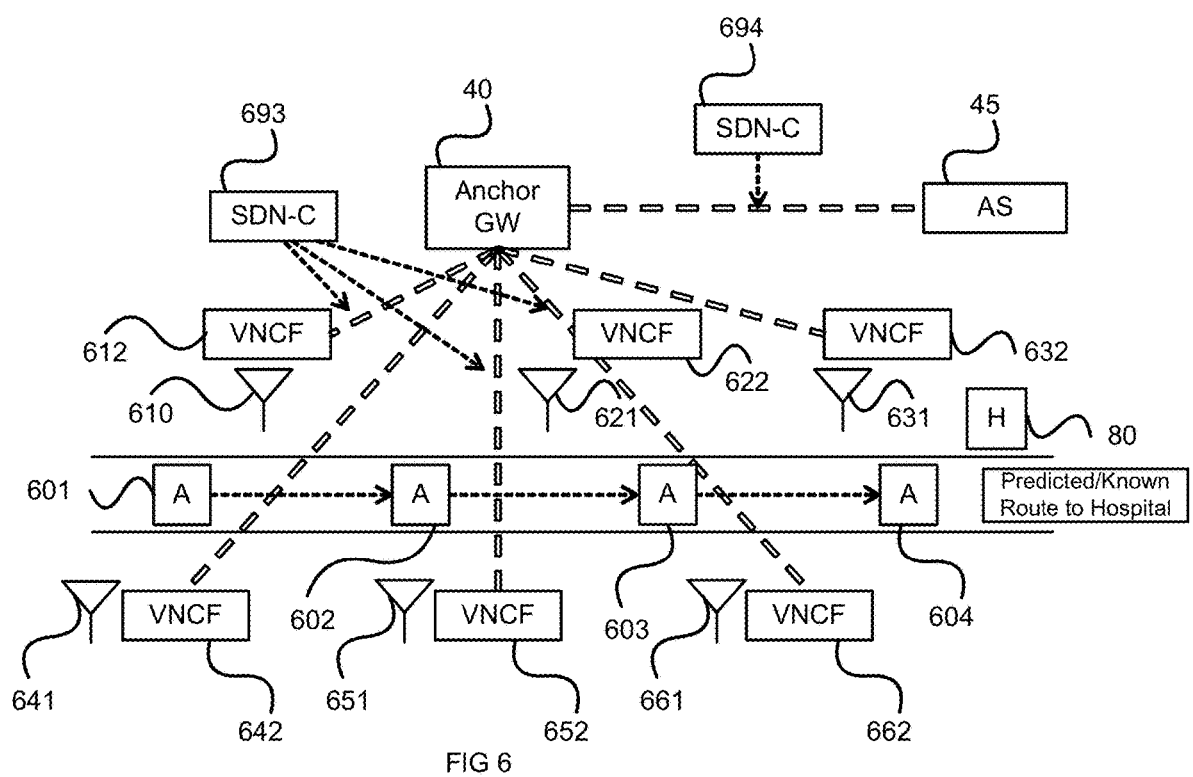
FIG. 6 illustrates a simplified network topology for a predicted route to the hospital.

FIG. 6 shows a simplified network topology for a predicted route to the hospital 80, according to an embodiment. Each "A" 601, 602, 603 and 604 represents a different location at which the ambulance is located (at different times) as the ambulance traverses the predicted route. As FIG. 6 illustrates the network topology, the route is illustrated in a straight line, even though the ambulance may make multiple turns as needed. The an entity within the network (for example a G-CMM entity configured for an m-Health application) can determine what NFVI (e.g. APs 610, 621, 631, 641, 651 and 661) exist along the predicted route. The MANO then instantiates corresponding L-GW VNFCs 612, 622, 632, 642, 652 and 662 along the route. In some embodiments, there need not be a one-to-one correspondence between the L-GWs and the APs. Typically instantiating the L-GW as close to the radio edge as possible will reduce the latency of communications with the mobile device, but may come at the cost of requiring more L-GWs to be created and at the additional cost of moving the state of an active L-GW across the large number of L-GWs. An L-GW can support more than one AP, for example for a dense urban area with closely located APs (e.g. pico cells), a plurality of APs may rely upon a single PoP, and an L-GW instantiated at that PoP could serve the plurality of APs. A VNFC, can either be instantiated or not. If it has been instantiated, the VNFC can either be configured or not. An instantiated and configured VNFC can be either active or not (referred to as being inactive). It should be noted that neither instantiating nor configuring a VNFC cannot be done instantly. However, if a VNFC is instantiated and configured, changing it to an active state can be done very quickly. A VNFC that is not in the Active state, consumes network resources, but not as many network resources as a VNFC in the active state. Accordingly, the VNFCs for the D-GW can be both Instantiated and Configured when the predicted routes are identified (which may happen during dispatch). The VNFCs can remain inactive so that they do not unnecessarily consume network resources. As the ambulance approaches the serving range of an AP, the VNFC associated with the AP can be changed to active. In some embodiments, the VNFC's can be activated well in advance of when they are needed, whereas in other embodiments the VNFCs can be activated on a "just-in-time" basis. However, in order to mitigate state handover delays between the active VNFCs, VNFCs associated with a serving AP may be activated prior to radio connections between the ambulance and the AP are established.

The dashed lines in FIG. 6 between the AS 45 and the Anchor GW 40, and between the Anchor GW 40 and each of the VNFCs 612 622 632 642 650 and 662, represent potential user plane paths for data traffic. It should be appreciated that there may be multiple network nodes (e.g. switches, routers, etc.) which can be used to forward traffic between the components. Accordingly, an SDN-C 694 configures the paths from the AS 45 located at the hospital to the A-GW 40, which may occur through providing instructions to the nodes at either end of the logical connection as well as the physical nodes at the end of links within the logical connection. In some embodiments, another SDN-C 693 configures the paths from the A-GW 40 to each of the VNFCs. It is noted that two SDN-Cs 693 and 694 are illustrated in this example, which may involve a separate data network, such as a wide area network (WAN), between the hospital and the A-GW 40. In some embodiments, a single SDN-C can be used to configure all the links. Multiple paths can be configured for reliability and to meet the delay and throughput requirements. Further, as previously stated, other embodiments may utilize an SMNF/SME instead of the SDN-C.

Figure 7:
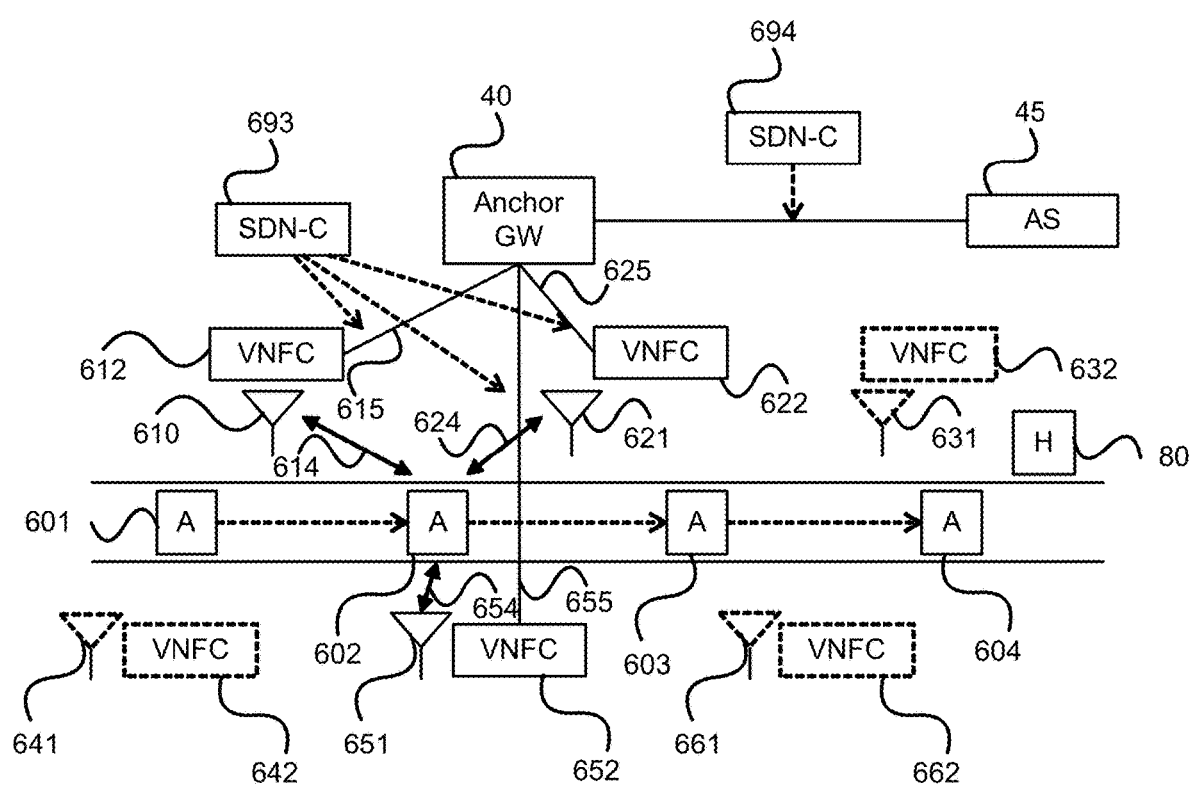
FIG. 7 illustrates the ambulance in position A2 where virtual network function components (VNFCs) in solid lines are activated.

In FIG. 7, the ambulance is in the second position 602 and is within the serving area of APs 610, 621 and 651. VNFCs 612 622 and 652 (shown in solid lines) would be active. A CMM entity, for example CMM 180 (as shown in FIG. 1), can determine which VNFCs to activate based on the ambulance location and trajectory. By activating only the VNFCs that are associated with the potential serving APs resources are conserved. Any data sent by AS 45 to Anchor GW 40 for delivery to the ambulance will be transmitted to the active L-GW VNFCs. As such, by only activating the VNFCs associated with the serving APs, resources in the network are conserved. The other VNFCs 632, 642 and 662, although instantiated and configured, remain inactive (and are shown in dashed lines). In some embodiments, a serving cluster of APs, which includes a plurality of APs each of which can establish radio connections to the ambulance, can be used. By making use of a serving cluster, additional throughput and redundancy, both for UL and DL can be achieved. In this example, three RAN access link connections 614, 624 and 654 are shown, but it is not necessary for each AP within range to have an active connection at all times. However, some embodiments configure user plane paths 615, 625 and 655 for each activated VNFC. DL data for the session is sent from the AS 45 at the hospital to the A-GW 40. The A-GW 40 then forwards the data to each active VNFC along the user plane paths 615, 625 and 655. Because the data is available at all active VNFCs, handover delay is eliminated. For example, the ambulance may initially be served by both AP 610 and AP 651 via RAN access links 614 and 654 respectively. As the ambulance moves, the ambulance receives a clearer signal from AP 621 than from AP 610. Accordingly, the CMM 180 instructs AP 624 to start serving the ambulance. The ambulance may be configured to only support a set number of connections (and only use the strongest connections if there are more than the set number available), or it may use all connections that are sufficiently robust. In such cases, the connection 614 to AP 610 can be dropped. The VNFC 612 can be deactivated (and possibly torn down). DL data sent by the AS 45 to Anchor GW 40 is buffered at L-GW 622 for transmission to the ambulance by AP 621 via access link 624. This allows the session to be maintained while avoiding data loss and delay for the handover from AP 610 to AP 621.

In some embodiments, to ensure reliability and low latency it is advantageous to ensure redundant end-to-end communication paths between the ambulance and the AS. Accordingly, a plurality of APs within a single serving cluster can serve the ambulance. Each AP that can connect to the ambulance can establish a user plane path to the AS. Each AP in the serving cluster can be used to forward the data to the ambulance using a suitable protocol, such as single frequency network (SFN) transmission, MBMS or Coordinated Multi Point (CoMP). In some embodiments, UL data, received by a plurality of APs from the ambulance, can be decoded in a number of different ways. Each AP can decode the data on its own, and then sent the decoded data to the A-GW 45, or alternately a shared decoding strategy which allows for each of the APs to provide information to a central decoder for a single decoding process can be employed. The data received or decoded at the A-GW 40 can then be forwarded to the AS 45. Accordingly, in the above example, data is still transmitted between the ambulance and the AP 651 via access link 654 during the handover from AP 610 to AP 621. Some embodiments can use coordinated or uncoordinated transmission using the same or different RATs.

As stated, as well as instantiating VNFCs along the predicted route, data plane paths (also referred to as user plane paths) through the network are established and configured to carry traffic between the AS (at the hospital) and the APs which serve the ambulance. These paths are configured prior to the ambulance reaching the serving area of any given AP. The path pre-configuration can help minimize delays in providing an end-to-end service between the AS and the ambulance. In some embodiments, the paths can be configured responsive to a determination of the predicted route. In some embodiments, the paths carrying DL traffic may be different than the paths which carry UL traffic, for example due to asymmetric capacity of the links and nodes within the paths, and recognizing the fact the UL traffic will often be greater for this particular example.

Figure 8:
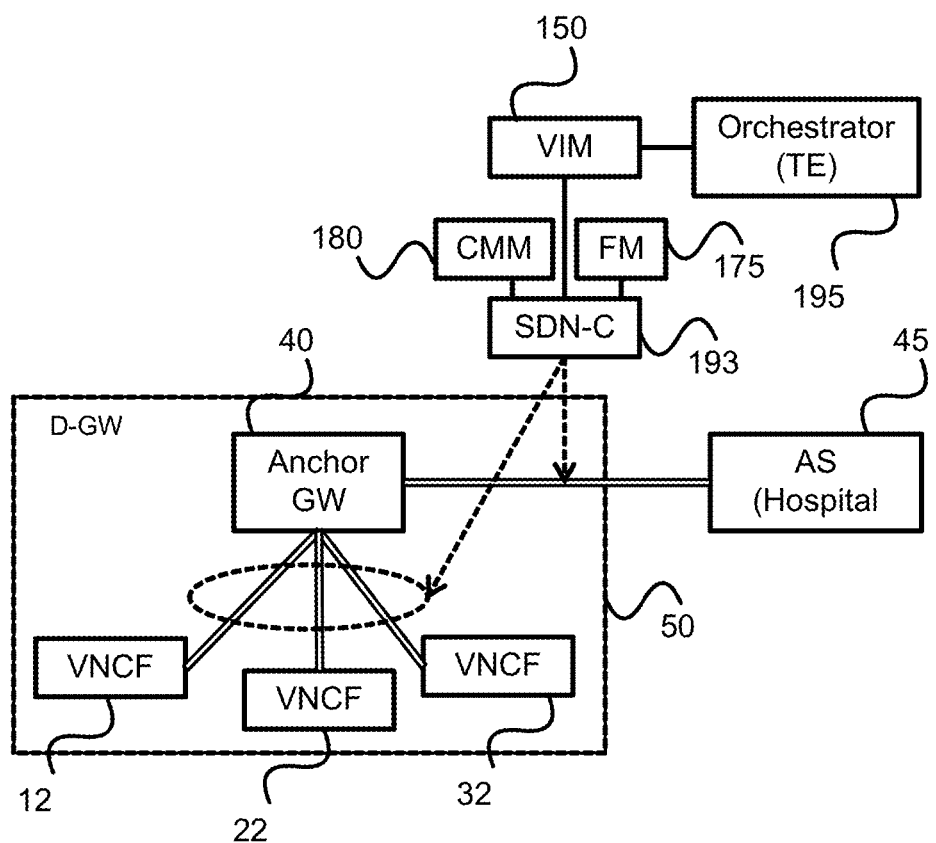
FIG. 8 illustrates the network entities involved with the path configuration, according to an embodiment.

FIG. 8 illustrates the network entities involved with the path configuration, according to an embodiment. Referring to FIG. 8, the AS 45, the ambulance, or some other entity (including $3^{rd}$ party software) determines the predicted route. A network entity (for example a G-CMM entity, or some other mobility management network function (MM NF) configured for an m-Health application) determines which APs in the network are along the predicted route. This determination can be performed taking into account both the geographic path of the route and the topology of the network (e.g. known locations for infrastructure in the network). In other words, the G-CMM determines which APs having a serving area through which the UE will pass as it moves along the predicted route. The MM function keeps track of the UE's serving cluster. This can be performed using DL measurement reports from the UE or using UL measurements from the APs. UL measurement reports may be particularly useful if the UE transmits an UL beacon. Once this selection of the APs in accordance with the predicted route and the network topology is complete, the TE function 195 in the Orchestrator 140 can determine the links between each of the APs and the AS 45, as well as the capacity bounds for each of the links This information is sent to the VIM 150, which then sends the flow and traffic management rules to the SDN-C 193. Based on the location of the ambulance, and the topology of the network, the ambulance may only be served by a limited number of VNFCs at a given time. The CMM function 180 can determine which AP (or APs) the data should be forwarded to. Similar determinations can be made to identify which VNFCs should be active at any time (if only the VNFCs serving the ambulance are active, then the CMM function 180 can simply transmit the data to all active VNFC-based L-GWs). The SDN-C 193 then provides the forwarding rules to the forwarding switches, for example routers and the like within the physical network architecture. It should be appreciated that multiple pre-configured paths can be established as there will likely be multiple active APs at a single time. Multiple paths can be configured for each source and destination pair for redundancy in case of link failure, and to meet the delay and throughput requirements. FM 175 manages the flows across the pre-configured paths. The FM function 175 can split the flows across the multiple paths to ensure that the capacity bounds of any given link are not violated and that the delay and throughput requirements are met. As stated, other embodiments may utilize an SMNF/SME instead of the SDN-C and/or TE functions.

Figure 9:
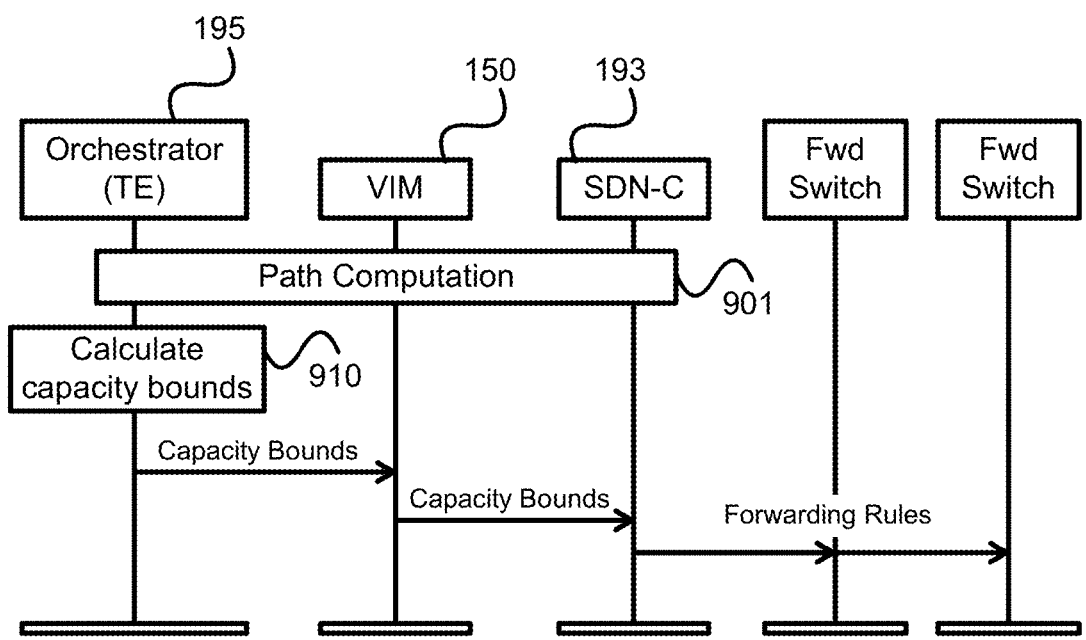
FIG. 9 illustrates a procedure for configuring the data plane path, according to an embodiment.

FIG. 9 illustrates a procedure for configuring the data plane path (also known as the user plane path) for the requested session according to an embodiment. The Orchestrator TE function 195 (e.g. the TE function 195 within the Orchestrator 140), the VIM 150 and the SDN-C 193 are involved with the path computation 901 for the data plane. It should be appreciated that the paths for the end-to-end service may span across multiple VIMs, and each VIM may contain its own SDN-C. In which case, the TE 195 operates across multiple VIMs. The VIM and the SDN-C 193 within the VIM has a complete view within the administrative domain of the VIM. Each VIM can determine the paths within its domain and send these paths to the TE 195, which can then calculate the capacity bound 910 per physical link across all VIMs. The AS, which may be part of a hospital network under a different administrative network domain may be one of the two ends of the complete end-to-end path. Accordingly, one of the domains may be administered by a WAN Infrastructure Manager (WIM).

After receiving the results of the path computation, the Orchestrator (TE function) 195 calculates the capacity bounds for each physical link in each path. The Orchestrator then forwards the capacity bounds to the VIMs/WIMs. The VIMs/WIMs forward rules, which can include the capacity bounds, to the SDN-Cs. The SDN-Cs then configures forwarding switches in the computed path, in part by providing forwarding rules. As stated, other embodiments may utilize an SMNF/SME instead of the SDN-C and or TE functions.

Figure 10:
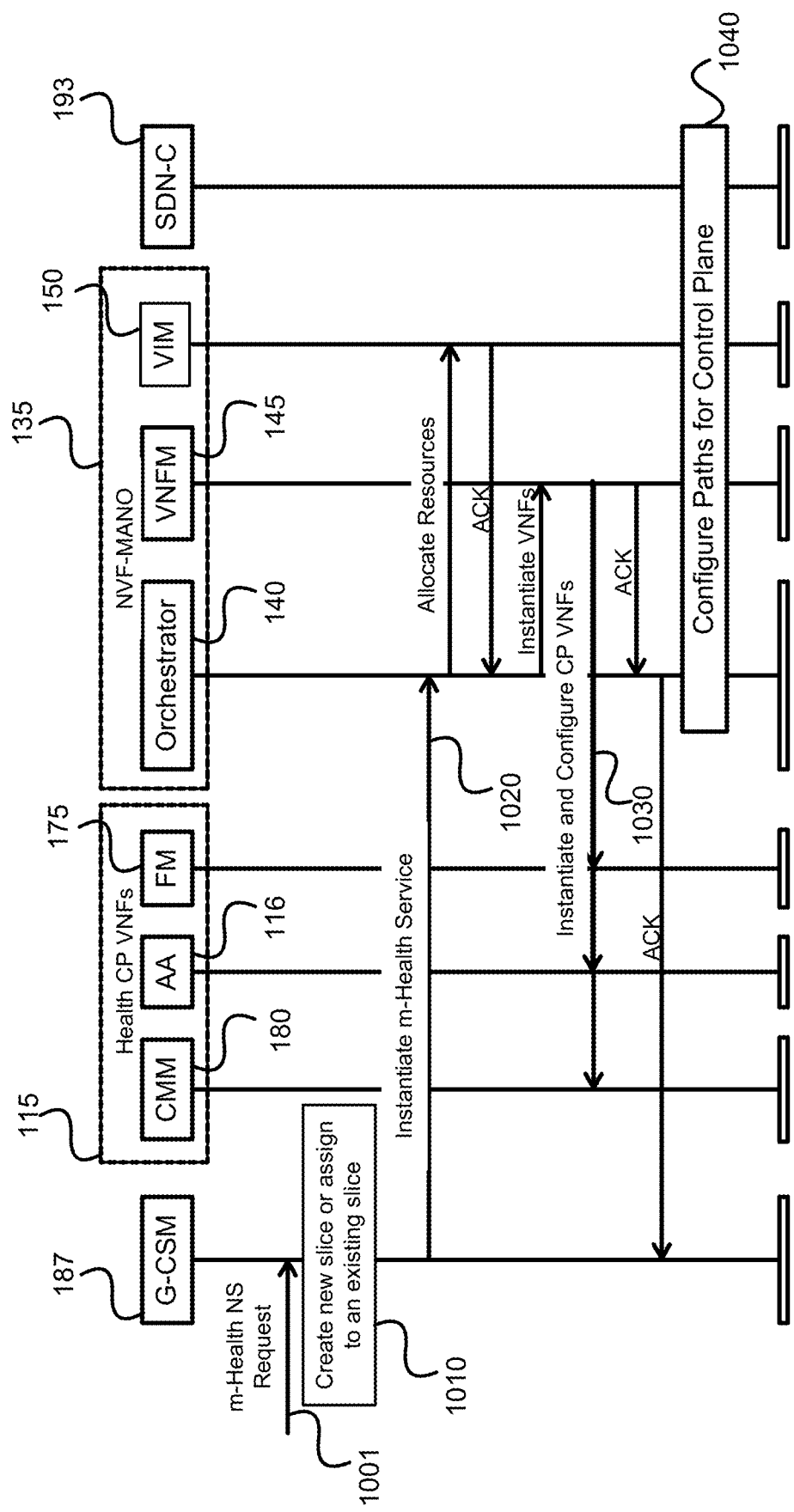
FIG. 10 illustrates a procedure for establishing the control plane (CP) functions and paths for a service request, according to an embodiment.

FIG. 10 illustrates a procedure for establishing the control plane (CP) functions and paths for an m-Health service request, according to an embodiment, with further reference to the architecture of FIG. 1. The m-Health Network Service (NS) request 1001 is sent to the G-CSM 187. The NS request is sent to request instantiation of the CP functions required to process the m-Health service request. In some embodiments, this NS request is sent by the hospital AS when the ambulance is dispatched. The request may include the VNFFG for instantiating the control plane, bandwidth and throughput requirements for the CP, the coverage are of the service, and any priority information (if available). In another embodiment, the request is sent from within the ambulance when the patient is picked up. Upon receipt of the request 1001, the G-CSM 187 either creates a new slice (if needed) or assigns the service to an existing slice in 1010, for example m-Health slice 115. As noted above, the process described here does not require that the service be provided within a slice. If the network does not support slicing, step 1010 can be omitted.

The G-CSM 187 sends a request 1020 to the Orchestrator to instantiate the CP functions required to provide the m-health service. Those skilled in the art will appreciate that the CP functions may already have been instantiated, and are simply awaiting the appropriate configuration. After receiving the request, Orchestrator 140 can also configures the CP paths between the functions. The CP functions can include service specific CMM 180, FM 175 and AA 116 functions. In some embodiments, service specific functions are instantiated for each m-Health NS. During the instantiation procedure, the G-CMM 182 is provided with the m-Health configuration details. A connection between the G-CMM 182 and the m-Health specific CMM(s) 180 is established. The NFV MANO 135 then instantiates and configure the CP VNFs 1030 and configures paths 1040 for the CP. Alternatively, if the m-Health service is instantiated onto an existing slice, then the CP functions within the slice may be used for the m-Health UEs.

Figure 11:
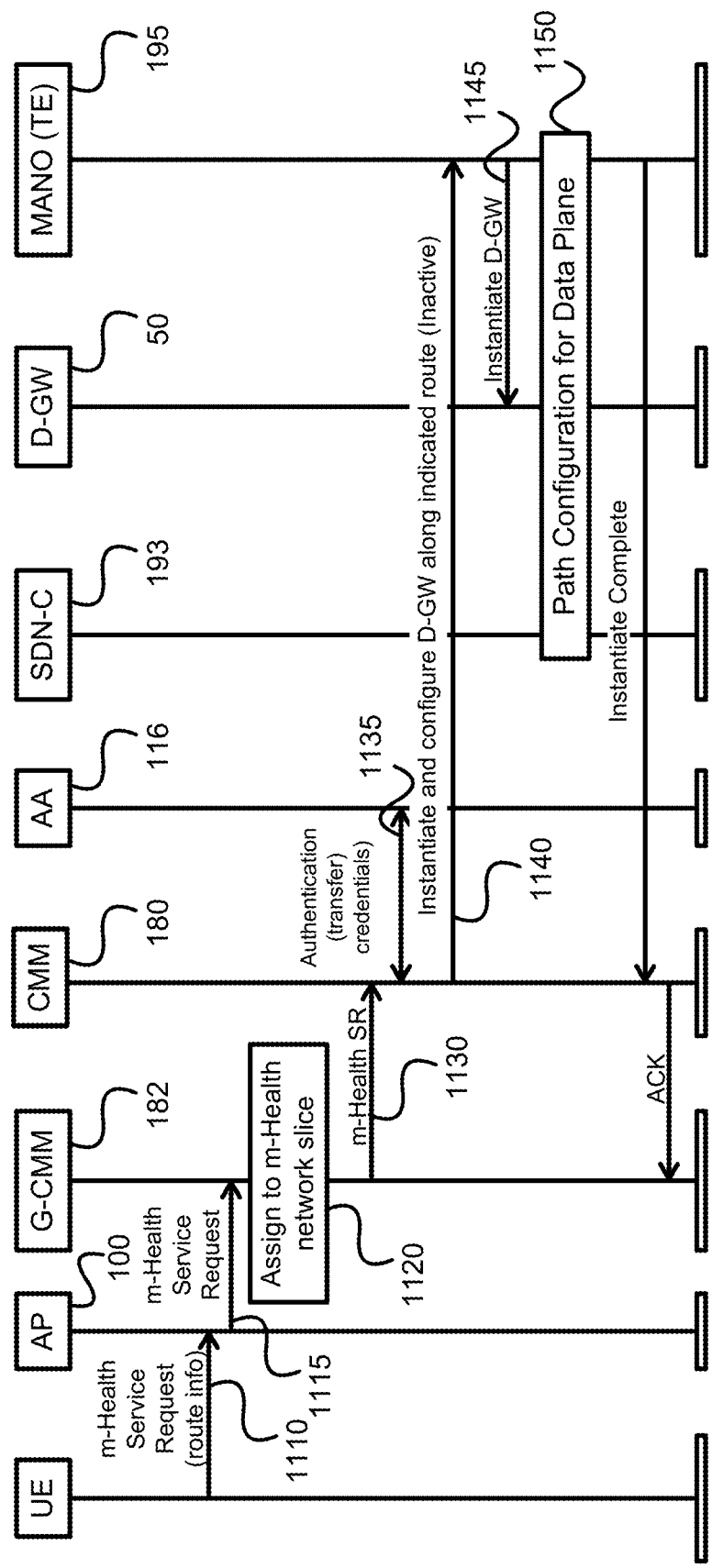
FIG. 11 illustrates a process for a user equipment (UE) (i.e. an ambulance) to attach to a network slice when it is dispatched.

FIG. 11 illustrates a process for a UE (for example an ambulance) to attach to the m-Health network slice or a slice supporting the m-Health service, when the ambulance is dispatched, according to an embodiment. The ambulance may already be attached to a common MBB slice. When the ambulance requires a reliable low latency communication session, for example for an emergency situation, the ambulance can send a new service/session request 1110 for a reliable low latency session to the AP 100. The AP 100 forwards 1115 the request to the G-CMM 182. G-CMM 182 can assign the UE to the m-Health slice (or another a critical communication slice supporting the m-Health service as appropriate) if the service is provided within a sliced network. In some embodiments, m-Health service request 1110 includes the predicted route from the dispatch location to the hospital, although, as discussed, in other embodiments the predicted route may originate elsewhere. Alternatively, the UE can first send an attach request to attach to the m-Health slice then send a new service request to establish an m-Health session.

Upon assigning the ambulance to the appropriate slice 1120, G-CMM 182 can send a service request (SR) 1030 to the CMM function 180. In some embodiments, the CMM function 180 would have been previously instantiated as part of the process of instantiating the m-Health service, for example as set out in FIG. 10. In some embodiments the functions required for provision of the service will have already been instantiated, and their addresses may be known. In such an embodiment, the AP 100 can be configured to forward the Attach Request 1115 directly to the CMM 180. The CMM 180 can authenticate 1135 the request, such as with the AA function 116. Upon authenticating the request received in 1130, CMM 180 can send a request 1140 to the MANO (TE) function 195 to instantiate (and configure) 1145 a D-GW 50 along the predicted route. The SDN-C 193 and the TE function 195 then establish 1150 data plane paths for each AP along the route. As stated, other embodiments may utilize an SMNF/SME instead of the SDN-C and or TE functions. In some embodiments, the D-GW may already be instantiated. In this case, the D-GW only needs to be configured with the UE context.

The methods discussed with reference to FIGS. 10 and 11 are directed to embodiments for networks which utilize network slicing. It should be appreciated that similar methods can be implemented for networks which do not utilize network slicing.

Figure 12:
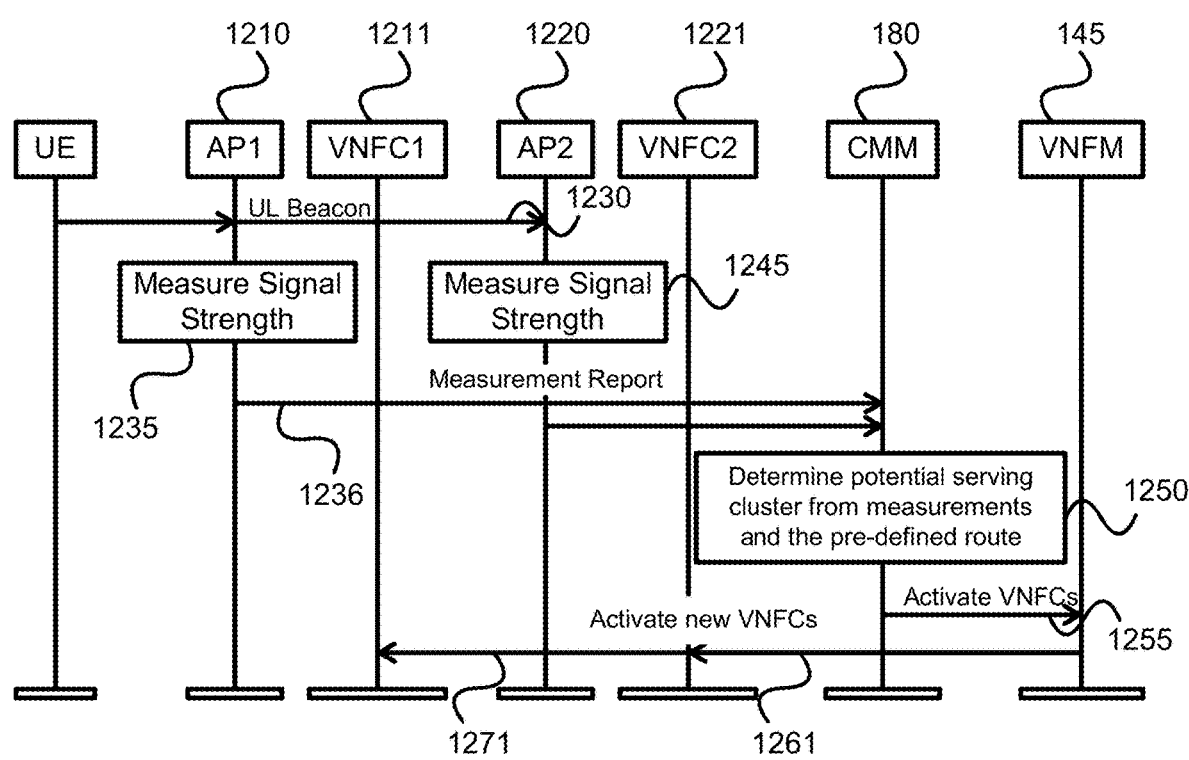
FIG. 12 illustrates a process for updating the serving cluster of a D-GW, according to an embodiment.

FIG. 12 illustrates a process for updating the serving cluster of a D-GW, according to an embodiment. As noted above, in some embodiments, the UE transits a UL beacon. This beacon is received by all APs within range of the UE. The UL beacon is received 1230 by both AP1 1210 and by AP2 1220 neither of which are part of the cluster of serving APs associated with the UE. Because the UL Beacon is broadcast by the UE, it will be received 1230 by both AP1 1210 and AP2 1220 as the UE approaches their serving areas. Each AP performs signal strength measurements 1235 and 1246 on the received UL beacon. These measured signal strengths are transmitted 1236 to the CMM 180. The received measurement reports from all APs, are used to determine the serving cluster membership in 1250. If the measurement report from an AP indicates that the UE is within a threshold distance of the AP, the CMM 180 can include the AP within the serving cluster. An AP that was not previously a part of the cluster will already have VNFCs created to support the UE (because the AP is part of the predetermined path), but the VNFC will be inactive. CMM 180 transmits an instruction 1255 to the VNFM 145 to begin the activation process for the VNFCs associated with the APs that are being added to the serving cluster. As illustrated in FIG. 12, the VNFM 145 responds by transmitting VNFC activation instructions to each of VNFC1 1211 (which is associated with AP1 1210) and VNFC2 1221 (which is associated with AP2 1220). Although not illustrated in FIG. 12, it will be understood that if an AP that is part of the serving cluster transmits a measurement report indicating that the UE UL beacon is no longer being received, the CMM 180 may conclude that the AP should be removed from the serving cluster. A message can be sent to the VNFM 145 to deactivate the VNFC associated with the AP that is being removed from the serving cluster. It should be understood that the VNF may not be terminated in all embodiments, as there may be a benefit to leaving the VNF instantiated and configured for a period of time (e.g. a change in direction of the ambulance requires it to backtrack).

Figure 13:
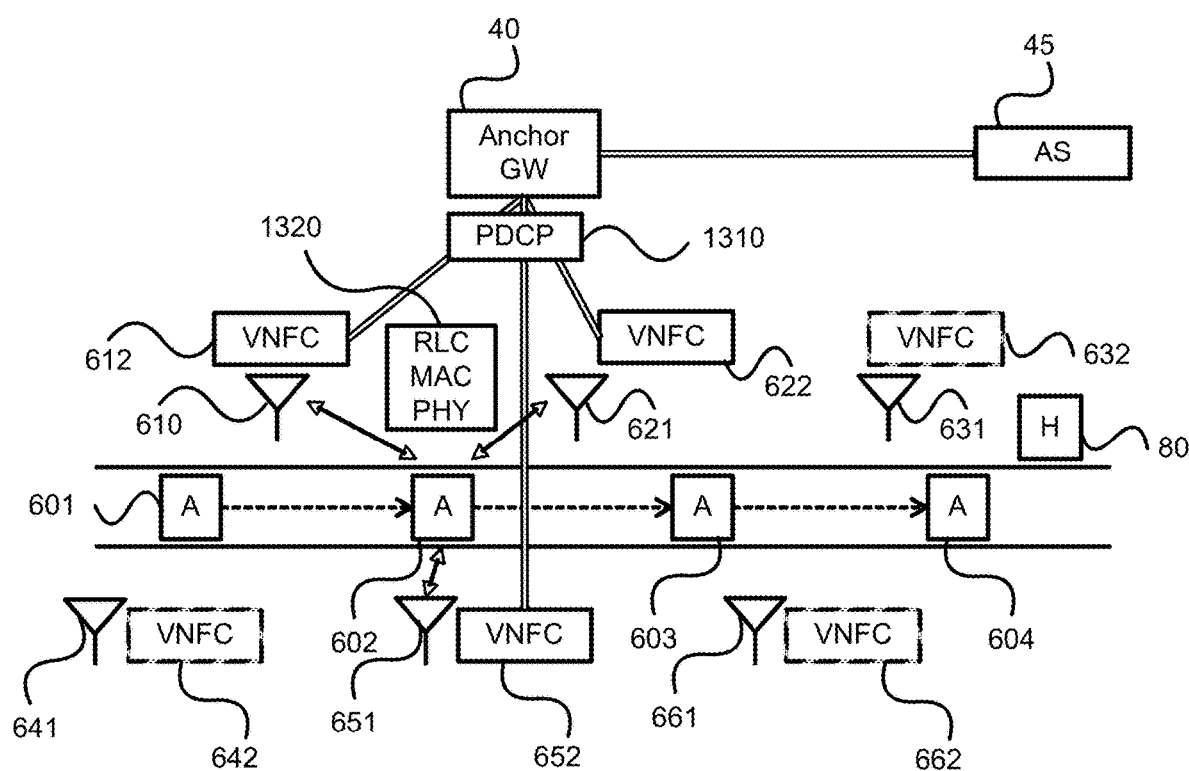
FIG. 13 is similar to FIG. 7 but includes a Customized Protocol Stack for improved security, according to an embodiment.

FIG. 13 is similar to FIG. 7 but includes a Customized Protocol Stack for improved security, according to an embodiment. In order to reduce delay and provide improved security for the m-Health data on the access link, a VNF with a customized security protocol (e.g. enhanced Packet Data Convergence Protocol (PDCP)) 1310 can be instantiated at the same PoP as the A-GW. A customized Physical (PHY), Medium Access Control (MAC) and Radio Link Control (RLC) layer protocol handling function 1320 can be instantiated within a baseband unit (BBU) at the PoPs hosting the VNFCs of the D-GW, as will be discussed below with reference to FIG. 14. In an embodiment, the PoP can include a data center which includes computing resources that support multiple virtual machines for hosting the VNFC, the customized protocol stack, and other functions. As will be discussed below with reference to FIG. 16, the A-GW 40 may include a resource scheduler for the serving APs. Common radio resources can be reserved at the serving APs to enable synchronized transmission of the same data using the same resources, for example utilizing SFN transmission or CoMP, or the like.

Figure 14:
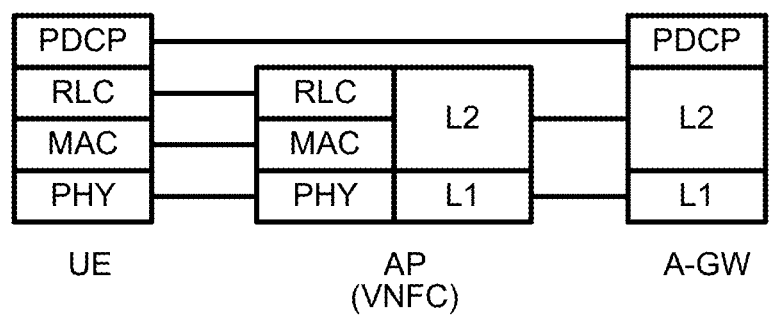
FIG. 14 shows the Customized Protocol Stack for improved security, according to an embodiment.

FIG. 14 shows the Customized Protocol Stack discussed in FIG. 13, according to an embodiment. The modified PDCP function 1310 can be instantiated at the same PoP as the Anchor GW. In such an embodiment, the modified PDCP function, which interfaces with the UE, is effectively moved from the AP to the A-GW, which controls the PDCP function for each AP of the D-GW. Further, the PDCP can be enhanced to use more robust encryption and integrity protection algorithms. For example, key length can be increased from 128 bits to 256 bits (or higher). The algorithms and keys for encryption and integrity protection can be configured when the A-GW is established. Such encryption might be utilized to help ensure the privacy of patient data, but it can also be used for integrity checking, for example to prevent tampering. By placing the PDCP function at the A-GW, the security keys can be distributed to each node within the serving cluster simultaneously. Those skilled in the art will appreciate that the key length can be dynamically adjusted depending on the processing abilities of the network functions used by the service at any given time. In one embodiment, a lower bound on the strength of the encryption is defined, and the encryption provided will never drop below the threshold, but if there are sufficient computing resources available a longer key can be used. Changes in the length of the key can be managed at a control or management plane level.

Figure 15:
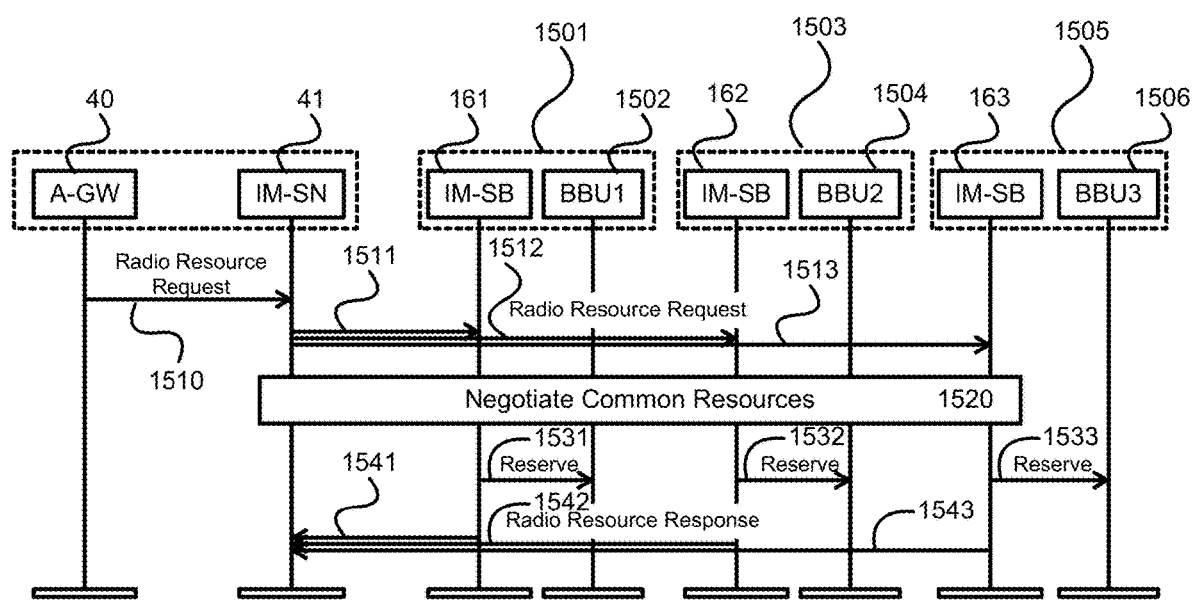
FIG. 15 shows a radio resource allocation procedure, according to an embodiment.

FIG. 15 shows a radio resource allocation procedure, according to an embodiment. The A-GW VNFC 40 may include an IM-SN function 41 for negotiating common spectrum resources for each AP serving the ambulance (e.g., for SFN transmission). Alternatively, the IM-SN can be a separate VNF, for example a global function or the IM-SN function 190 of slice 115. An IM-SB function is instantiated at each PoP hosting the VNFCs of the D-GW. In this example, IM-SB 161 function is instantiated within PoP 1501 which includes BBU1 1502, IM-SB 162 function is instantiated within PoP 1503 which includes BBU2 1504, IM-SB 163 function is instantiated within PoP 1505 which includes BBU3 1506. IM-SN 41 sends radio resource requests 1511, 1512 and 1513 to IM-SB 161, IM-SB 162, and IM-SB 163 respectively. Each IM-SB reserves the radio resources for the m-Health service with their respective BBU via messages 1531, 1532, and 1533 and the BBUs send their responses via messages 1541, 1542, and 1543 respectively. Alternatively, other transmission schemes can also be used that do not require common radio resources. In some embodiments, the IM-SN function and IM-SB function, and thus SN and SB functions, may be applied to cover other types of Radio Access Technologies (RATs), for example, WiFi, unlicensed cellular frequency bands, and the like.

Figure 16A:
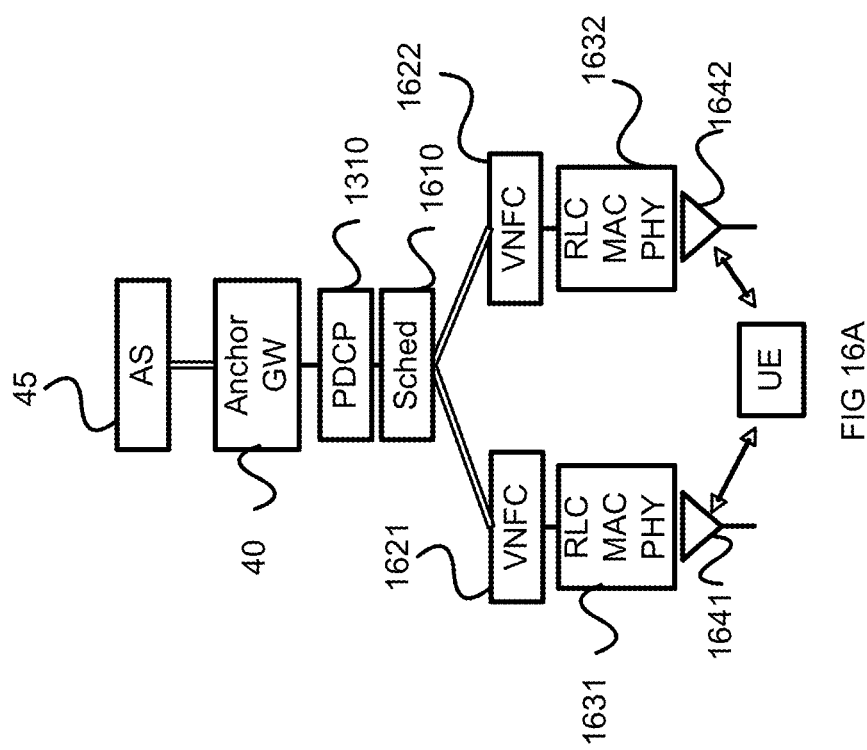
FIG. 16A and FIG. 16B illustrate two views of an alternative radio resource allocation scheme, according to an embodiment.
Figure 16B:
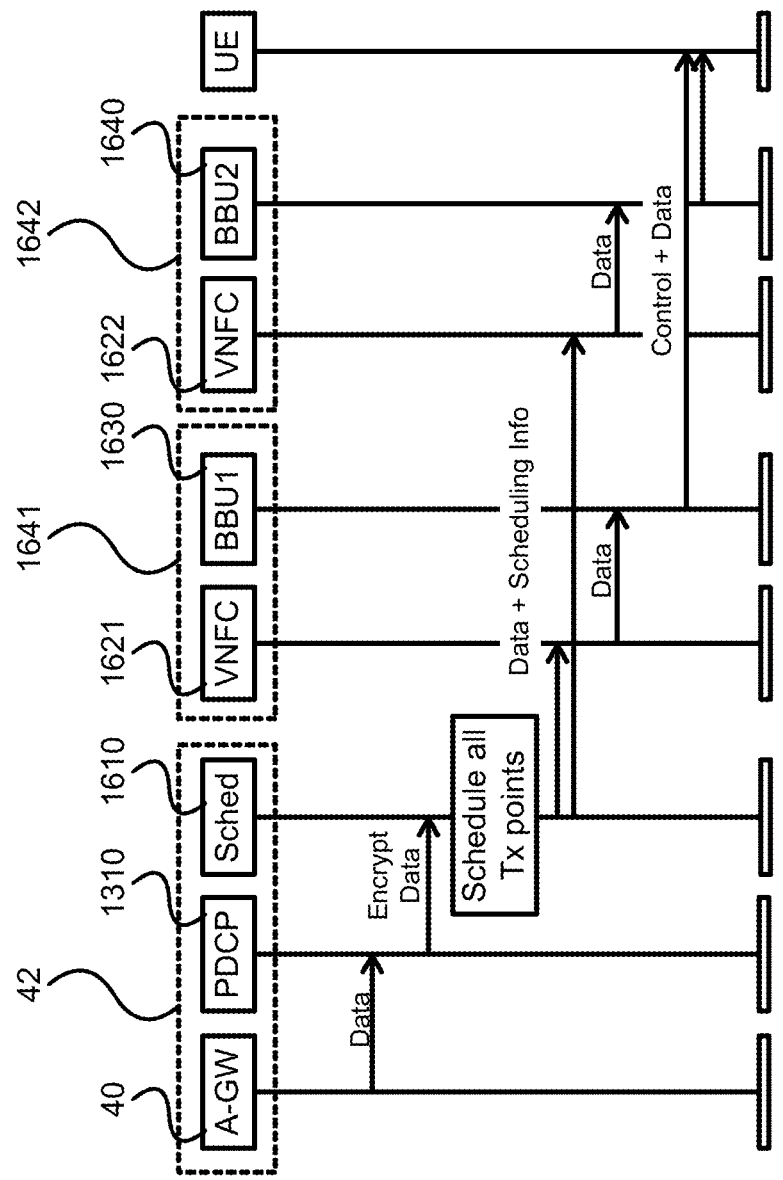

FIG. 16 illustrates two views of an alternative radio resource allocation scheme, according to an embodiment. FIG. 16A illustrates a UE being served by two APs according to an embodiment, and FIG. 16B illustrates example message and data flows for such an embodiment. In this embodiment, different resources can be used for each serving AP 1641 and 1642, and two different AP types can be used. In other words, the two APs need not use the same RAT, although they each should have a connection to the 5G core (m-Health network slice). In this embodiment, a centralized scheduler 1610, along with PDCP function 1310 can be located at the PoP 42 hosting the A-GW 40. AP PoP 1641 hosts L-GW VNFC 1621 and includes BBU1 1630 which can implement an RLC/MAC/PHY protocol 1631 according to a first RAT. AP PoP 1642 hosts L-GW VNFC 1622 and includes BBU2 1640 which can implement an RLC/MAC/PHY protocol 1632 according to a second RAT. Scheduler 1610 can schedule all of the transmit points (in this example BBU1 1630 and BBU2 1640) and the scheduling information can be sent to each serving AP along with the encrypted data.

As stated, it should be noted that the systems and methods discussed herein can be extended to other communication services with similar reliability and low latency requirements and which utilize a predictable route. As but one example, embodiments can be extended for other emergency dispatch situations, for example if police, fire rescue and one or more ambulances are sent to an accident site. Also, the systems and methods described herein can be extended to non-emergency applications for which there is a predictable route, such as for providing a reliable low latency service to multiple users within a moving train or motorcade.

Although the above descriptions have focussed on a mobile platform, e.g. an ambulance, it will be understood by those skilled in the art that the m-Health platform manages the movement of entities with respect to the network infrastructure (physical or virtual). It is possible that a stationary platform can make use of the disclosed method and systems. In situations where a service provider will change the network on which the m-Health platform is supported, for any of a number of reasons, the above systems and methods can be used. Although when discussing a vehicle like an ambulance, it is generally considered that the vehicle moves with respect to the infrastructure, it is possible that an ambulance will be stationary and, due to network loading, the AP that the ambulance is connected to will change. The ability to move to an already configured gateway on the new AP will provide the same advantages as when the ambulance is moving. As such, it should be understood that the concept of high mobility handovers includes any movement of the ambulance relative to the topological locations of the mobile network infrastructure.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 17:
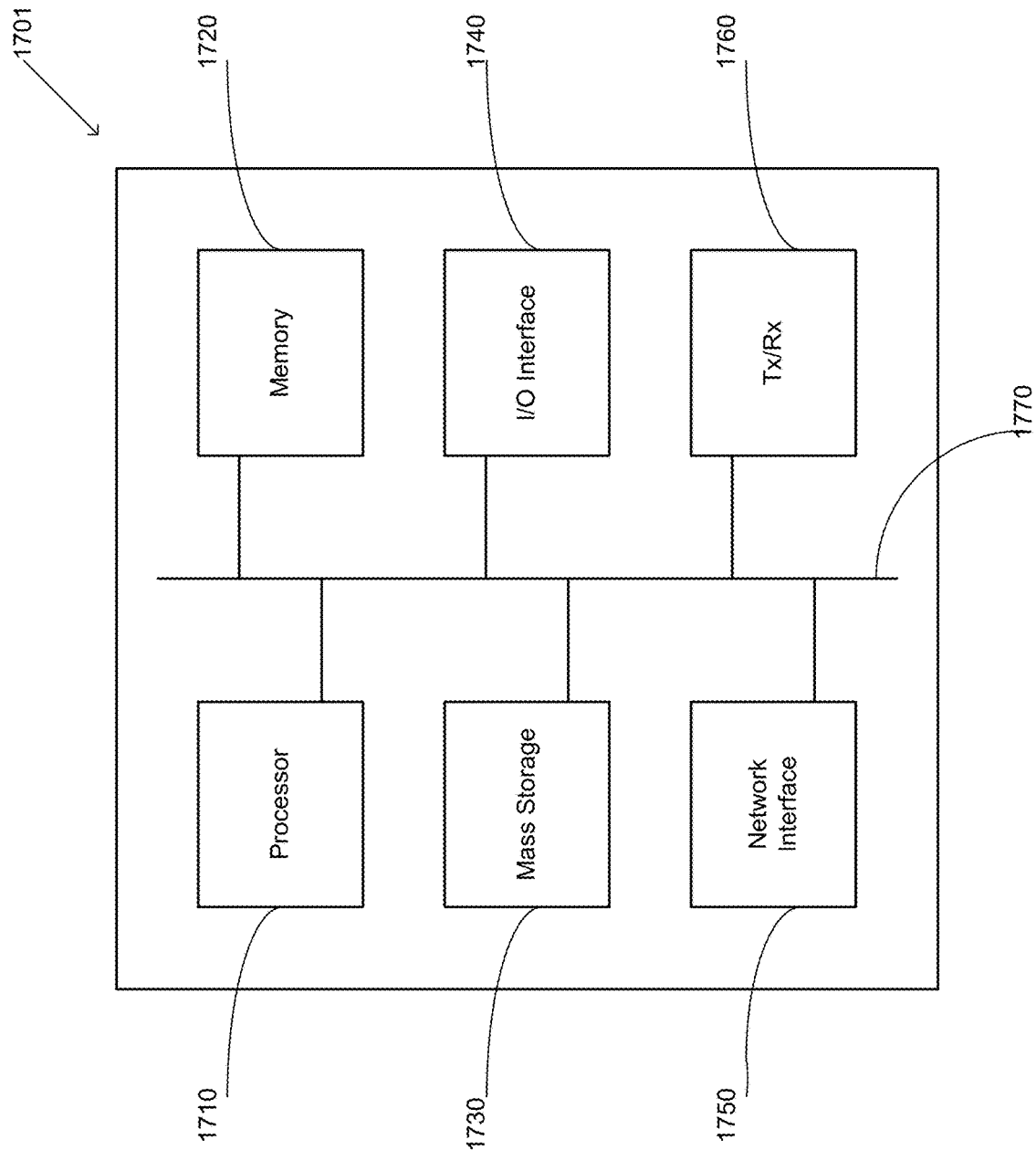
FIG. 17 illustrates a processing system which can act as a host for the network functions, according to an embodiment.

FIG. 17 is an exemplary block diagram of a processing system 1701 that may be used for implementing the various network functions. As shown in FIG. 17, processing system 1701 includes a processor 1710, working memory 1720, non-transitory storage 1730, network interface, I/O interface 1740, and depending on the node type, a transceiver 1060, all of which are communicatively coupled via bi-directional bus 1770.

According to certain embodiments, all of the depicted elements may be utilized, or only a subset of the elements. Further, the processing system 1701 may contain multiple instances of certain elements, such as multiple processors, memories, or transceivers. Also, elements of processing system 1701 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing system 1701 can be used to implement a node or host which executes the various network functions described herein.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

I claim:

1. A method of supplying a mobile communication service between a mobile device and a destination node through a core network comprising:
   establishing network user plane paths through the core network from access points to the destination node; and
   providing the mobile communication service by changing the state of network functions depending on the location of the mobile device;
      wherein changing the state of the network functions comprises:
      determining a serving cluster from information provided by one or more access points;
      activating non-active local gateways for access points in the determined serving cluster and deactivating local gateways for access points which leave the serving cluster;
      and wherein determining a serving cluster comprises determining a serving cluster from information provided by the one or more access points and a predicted route for a mobile device.

2. The method of claim 1 comprises further comprising configuring an Anchor Gateway function and a scheduler function in a first node and a plurality of Local Gateway functions, with each local gateway associated with an access point; wherein the scheduler schedules data transmission for each access point.

3. The method of claim 2 wherein the first node further includes a Packet Data Convergence Protocol function for implementing a Packet Data Convergence Protocol between each access point and the mobile device.

4. The method of claim 3 wherein encrypted data is distributed to each active local gateway and transmitted to the mobile device from each associated access point according to scheduling information sent by the scheduler.

5. The method of claim 4 wherein the Packet Data Convergence Protocol distributes the security keys to each local gateway in the serving cluster simultaneously.

6. The method of claim 1 wherein the serving cluster includes more than one AP which serves the mobile device using coordinated transmissions.

7. The method of claim 1 wherein the serving cluster includes more than one AP which serves the mobile device using un-coordinated transmissions.

8. The method of claim 1 wherein the serving cluster includes more than one AP which serves the mobile device using different radio access technologies.

9. The method of claim 1 further comprising:
   establishing a potential serving cluster of APs;
   determining an actual serving cluster of APs.

10. The method of claim 1 wherein the information provided by the one or more access points comprises measurement reports provided by the UE.

11. The method of claim 1 further comprising distributing data to configured network functions as the mobile device moves along the predicted route.

12. The method of claim 11 wherein configuring network functions comprises configuring network functions within nodes along the predicted route in advance of the mobile device approaching a serving area of access points associated with the nodes.

13. The method of claim 1 wherein changing the state of the network functions comprises activating network functions before the mobile device connects to access points along a predicted route of the mobile device.

14. The method of claim 13 wherein activating network functions comprises ensuring a seamless handover by activating the functions before the mobile device needs to connect to access points along the predicted route; and wherein changing the state of the network functions comprises de-activating network functions as the mobile device leaves the serving area of access points associated with network functions to be de-activated.

15. The method of claim 1 wherein a plurality of network functions are active concurrently such that multiple access points serve the mobile device at any given time.

16. The method of claim 15 wherein changing the state of the network functions comprises:
   activating a plurality of configured network functions to act as local gateways for a plurality of access points which simultaneously serve the mobile device; and
   wherein:
      downlink data is transmitted from the destination node to the local gateways for transmission to the mobile device; and
      uplink data is received by each of the plurality of access points which simultaneously serve the mobile device and forwarded to the destination node via the local gateways.

17. The method of claim 1 wherein establishing and configuring network paths comprises configuring redundant user plane paths between the destination node and the access points.

18. The method of claim 1 wherein establishing and configuring network paths comprises ensuring there are no delays in providing an end-to-end service between the mobile device and the destination node by configuring user plane paths prior to the mobile device reaching a serving area of an access point.

19. The method of claim 1 wherein the destination node is an application server.

20. The method of claim 19 wherein application server functionality is instantiated within the network functions to reduce the amount of data which needs to be transmitted between the network functions and the application server.

21. The method of claim 1 further comprising determining the predicted route for a mobile device.

22. The method of claim 21 wherein determining the predicted route comprises receiving a notification as to which access points have serving areas along the predicted route.

23. A session management network function comprising:
   a network interface for receiving a network service request for a mobile communication service between a mobile device and a destination node through a core network and for transmitting instructions;
   a processor;
   a non-transient memory for storing instructions which when executed by the processor cause the session management network function to:
      configure network functions along a predicted route of the mobile device;

establish and configure network user plane paths through the core network from access points along the predicted route to the destination node; and provide the mobile communication service by changing the state of the network functions depending on the location of the mobile device, wherein changing the state of the network functions comprises:

determining a serving cluster from information provided by one or more access points;

activating non-active local gateways for access points in the determined serving cluster and deactivating local gateways for access points which leave the serving cluster and wherein the instructions which cause the session management network function to determine a serving cluster comprises instructions for determining a serving cluster from information provided by one or more access points and a predicted route for a mobile device.

24. The session management network function of claim 23 wherein the instructions which cause the session management network function to configure network functions comprises instructions to configure virtual functions within nodes along the predicted route in advance of the mobile device approaching a serving area of access points associated with the nodes.

25. The session management network function of claim 24 wherein the instructions which cause the session management network function to change the state of the network functions comprises instructions to activate the network functions before the mobile device connects to access points associated with the nodes.

26. The session management network function of claim 23 wherein the instructions cause the session management network function to ensure a seamless handover by activating the functions before the mobile device needs to connect to access points; and wherein changing the state of the network functions comprises de-activating network functions as the mobile device leaves a serving area of access points associated with the network functions.

27. The session management network function of claim 26 wherein a plurality of network functions are active concurrently such that multiple access points serve the mobile device at any given time.

28. The session management network function of claim 23 wherein the information provided by one or more access points includes measurement reports received from the one or more access points.

29. A communication system comprising a session management network function and one or more access points, wherein the session management network function is configured to:

establish network user plane paths through a core network from the one or more access points to a destination node; and change a state of network functions depending on a location of a mobile device to provide a mobile communication service between the mobile device and the destination node through the core network;

wherein changing the state of the network functions comprises:

determining a serving cluster from information provided by the one or more access points and a predicted route for the mobile device;

activating non-active local gateways for one or more access points in the determined serving cluster and deactivating local gateways for one or more access points which leave the serving cluster;

the one or more of the access points is configured to:

provide the information to the session management network function.

30. The communication system of claim 29 wherein the destination node is an application server.

31. The communication system of claim 29 wherein the session management network function is further configured to receive a notification as to which the one or more access points have serving areas along the predicted route and determine the predicted route for the mobile device.

32. The communication system of claim 29 wherein the session management network function is further configured to distribute data to the network functions as the mobile device moves along the predicted route.

* * * * *